United States Patent
Tirapu Azpiroz et al.

(10) Patent No.: US 10,235,489 B2
(45) Date of Patent: *Mar. 19, 2019

(54) METHOD FOR OPTIMIZING THE DESIGN OF MICRO-FLUIDIC DEVICES

(71) Applicant: INTERNATIONAL BUSINESS MACHINES CORPORATION, Armonk, NY (US)

(72) Inventors: Jaione Tirapu Azpiroz, Rio de Janeiro (BR); Peter W. Bryant, Rio de Janeiro (BR); Rodrigo N. B. Ferreira, Rio de Janeiro (BR); Bruno D. C. Flach, Rio de Janeiro (BR); Ronaldo Giro, Rio de Janeiro (BR); Ricardo L. Ohta, Sao Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/800,508

(22) Filed: Nov. 1, 2017

(65) Prior Publication Data

US 2018/0068045 A1 Mar. 8, 2018

Related U.S. Application Data

(63) Continuation of application No. 15/088,581, filed on Apr. 1, 2016, now Pat. No. 9,892,225.

(51) Int. Cl.
*G06F 17/50* (2006.01)
*G06G 7/50* (2006.01)
*B01L 3/00* (2006.01)

(52) U.S. Cl.
CPC .... *G06F 17/5068* (2013.01); *B01L 3/502707* (2013.01); *G06F 17/5009* (2013.01);
(Continued)

(58) Field of Classification Search
CPC ............ G06F 17/5068; G06F 17/5009; G06F 2217/06; G06F 2217/08; G06F 2217/12;
(Continued)

(56) References Cited

U.S. PATENT DOCUMENTS 4,967,367 A * 10/1990 Piednoir ............. G06F 17/5045
716/102
6,885,982 B2 4/2005 Harris et al.
(Continued)

OTHER PUBLICATIONS

Junping Geng et al., The Study on the Antenna Optimization, PIERS Proceedings, Xi'an, China, Mar. 22-26, 2010, pp. 706-709.
(Continued)

*Primary Examiner* — Phallaka Kik
(74) *Attorney, Agent, or Firm* — Tutunjian & Bitetto, P.C.; David Quinn

(57) ABSTRACT

Methods and systems for fabricating micro-fluidic devices include determining a target cost function value based device design parameters. The performance of one or more chosen design candidates is simulated in a selected simulation model. A design candidate is identified with a cost function value closest to the target cost function value as a best initial design candidate. Design parameters of the best initial design candidate are iteratively modified to provide a modified design candidate having design parameters differing from the design parameters of the best initial design candidate, a cost function value is iteratively calculated for the modified initial design candidate, and optimized device design parameters are iteratively derived from a modified design candidate, until a computed cost function value for the modified design candidate meets the determined target cost function value. An optimized micro-fluidic device is fabricated using the modified design candidate and the optimized device design parameters.

20 Claims, 28 Drawing Sheets

(52) U.S. Cl.
CPC . *B01L 3/502761* (2013.01); *B01L 2200/0652* (2013.01); *B01L 2200/0668* (2013.01); *B01L 2300/0816* (2013.01); *B01L 2400/0424* (2013.01); *G06F 2217/06* (2013.01); *G06F 2217/08* (2013.01); *G06F 2217/12* (2013.01)

(58) Field of Classification Search
CPC . G06G 7/50; B01L 3/502707; B01L 2200/12; B01L 2200/06; B01L 2200/0652; B01L 2200/0668
USPC .................................. 716/132; 703/9, 15
See application file for complete search history.

(56) References Cited

U.S. PATENT DOCUMENTS

| | | | |
|---|---|---|---|
| 7,526,741 B2 | 4/2009 | Lee et al. | |
| 9,892,225 B2* | 2/2018 | Tirapu Azpiroz | G06F 17/5068 |
| 2005/0072946 A1* | 4/2005 | Studer | G06F 17/5018 251/11 |
| 2006/0264780 A1* | 11/2006 | Holmes | A61B 5/1411 600/583 |
| 2008/0177518 A1* | 7/2008 | Krishnamoorthy | G06F 17/5009 703/9 |
| 2015/0273735 A1 | 10/2015 | Cohen | |
| 2016/0154908 A1* | 6/2016 | Maddala | G06F 17/5009 703/1 |
| 2017/0100714 A1* | 4/2017 | Jain | B01L 3/50273 |
| 2018/0185839 A1* | 7/2018 | Jain | G01N 33/4905 |
| 2018/0231469 A1* | 8/2018 | Gibbons | A61B 5/1411 |

OTHER PUBLICATIONS

C. Zhang et al., Dielectrophoresis for manipulation of micro/nano particles in microfluidic systems, Anal Bioanal Chem, Jan. 2010, 396:401-420.

Chen Wang et al., Highly Efficient Light-Trapping Structure Design Inspired by Natural Evolution, Scientific Reports 3, Article No. 1025, Jan. 3, 2013, pp. 1-8.

M.P. MacDonald et al., Microfluidic sorting in an optical lattice, Nature, vol. 426, Nov. 27, 2003, pp. 421-424.

Philipp Hahn et al., Modeling and optimization of acoustofluidic micro-devices, Lab Chip, pp. 3937-3948, Jul. 2014.

David G. Grier, A Revolution in Optical Manipulation, Nature 424, 810-816, Aug. 14, 2003.

David J. Collins et al., Particle separation using virtual deterministic lateral displacement (vDLD), Lab Chip, pp. 1595-1603, Feb. 28, 2014.

List of IBM Patents or Patent Applications Treated as Related dated Nov. 1, 2017, 2 pages.

* cited by examiner

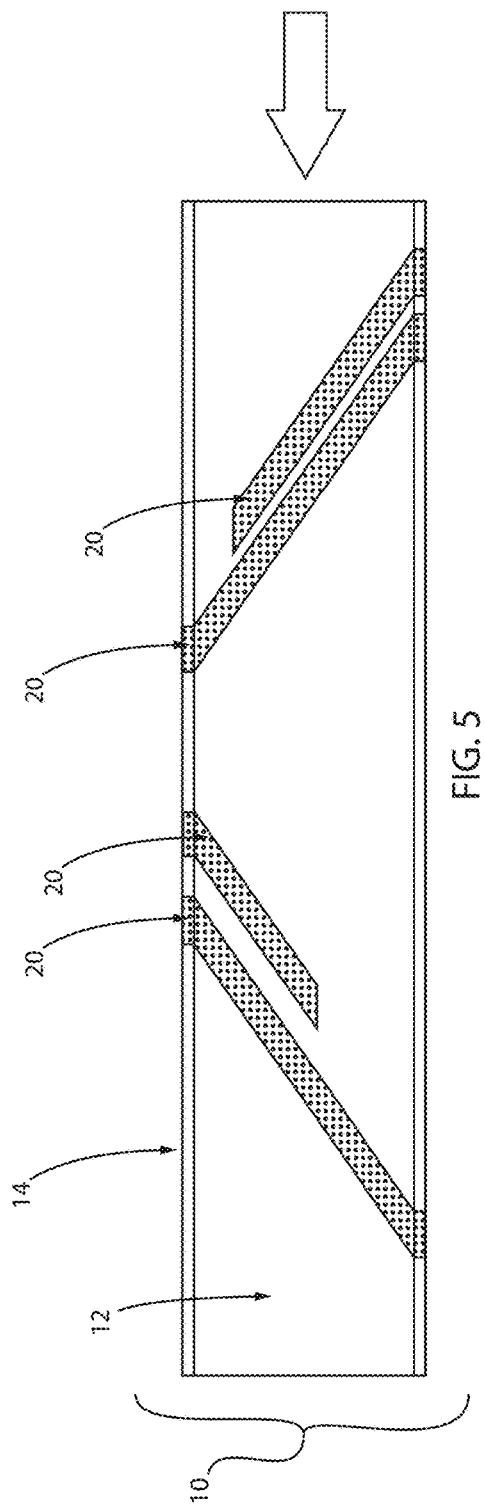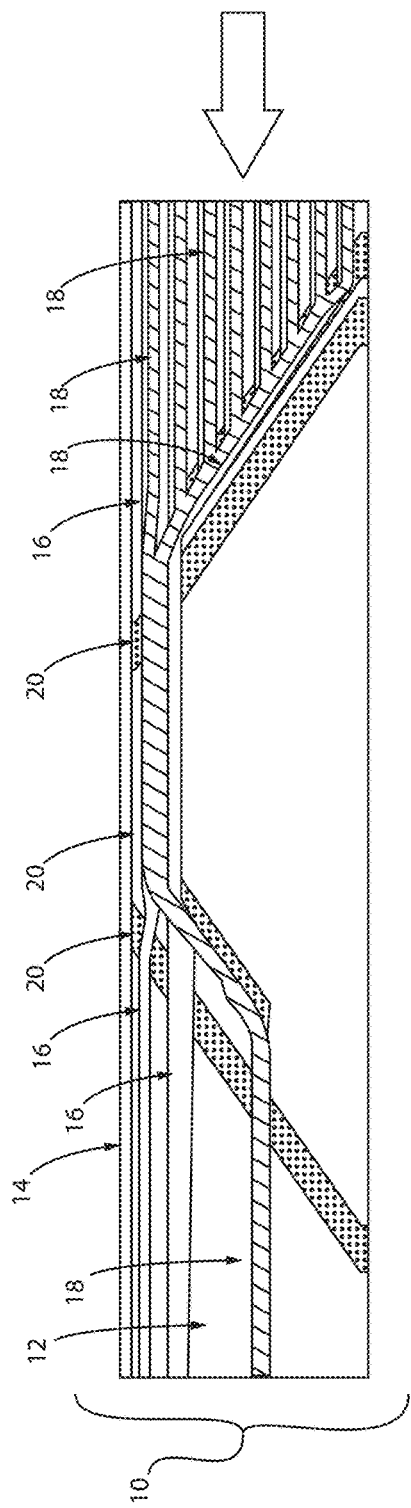
FIG. 5
FIG. 6

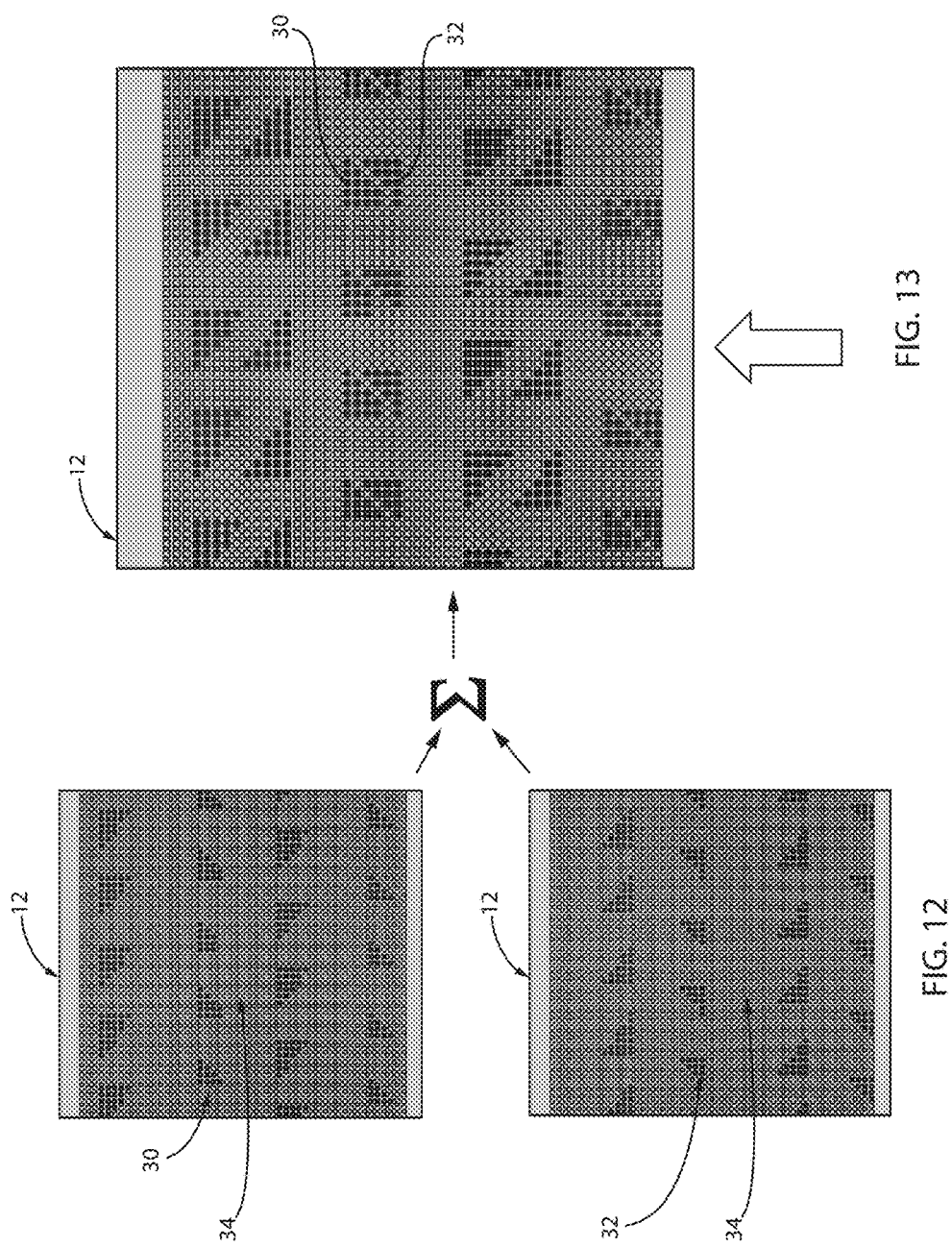

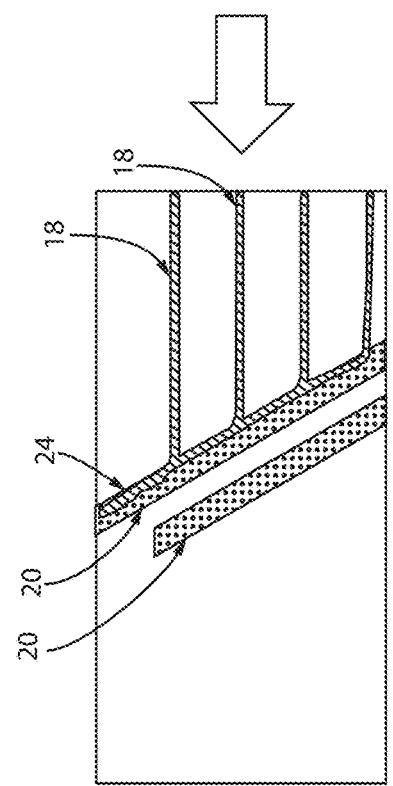
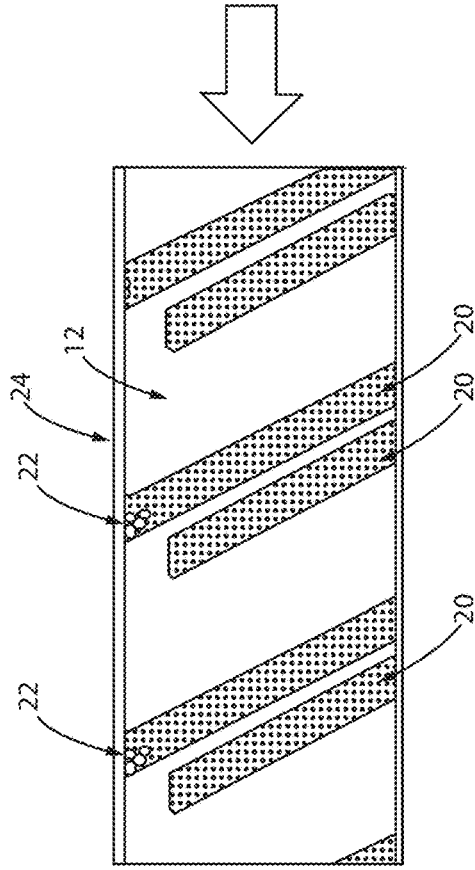

METHOD FOR OPTIMIZING THE DESIGN OF MICRO-FLUIDIC DEVICES

BACKGROUND

Technical Field

The present invention relates to a system and method for optimizing micro-fluidic devices used in handling small amounts of fluids and particles contained in the fluids. In particular, the system and method are directed to optimizing designs of micro-fluidic devices, depending upon factors such as particle characteristics, fluid characteristics and the tasks the devices are being designed to perform.

Description of the Related Art

Micro-fluidic applications often rely on their ability for touch-less manipulation of single cells, organisms, droplets or particles suspended in a fluid through the exploitation of electro-hydrodynamic effects, which may also be referred to as electrokinetics. By way of example, one such effect is dielectrophoresis (DEP), which is a force that enables the movement of dispersed particles in a fluid under the influence of a spatially non-uniform electric field. Dielectrophoresis is caused by the presence of a charged interface between the particle surface (in which the particles themselves are electrically neutral) and the surrounding fluid. A number of analytical techniques used in biochemistry for separating molecules by size, charge, or binding affinity are based on dielectrophoresis and the dielectrophoretic force associated therewith.

An effect such as the dielectrophoretic force can be influenced by factors such as the geometrical configuration and excitation scheme of the electric field (e.g., field generated in the device), the sizes of the particles, and properties of the particles and the fluid medium in which they are present.

SUMMARY

A method for fabricating micro-fluidic devices includes determining a target cost function value based device design parameters. The performance of one or more chosen design candidates is simulated in a selected simulation model. A design candidate is identified with a cost function value closest to the target cost function value as a best initial design candidate. Design parameters of the best initial design candidate are iteratively modified to provide a modified design candidate having design parameters differing from the design parameters of the best initial design candidate, a cost function value is iteratively calculated for the modified initial design candidate, and optimized device design parameters are iteratively derived from a modified design candidate, until a computed cost function value for the modified design candidate meets the determined target cost function value. An optimized micro-fluidic device is fabricated using the modified design candidate and the optimized device design parameters.

A system for fabricating micro-fluidic devices includes one or more processors including memory. A cost function calculator is configured to determine a target cost function value based device design parameters and to determine cost function values for design candidates. A simulation model operator is configured to simulate the performance of one or more design candidates in a selected simulation model and to identify a best initial design candidate based on computed cost function value. An optimization routine operator is configured to iteratively modify design parameters of the best initial design candidate to provide a modified design candidate having parameters that differ from the parameters of the best initial design candidate, to check a cost function value of the modified design candidate against the target cost function value, and to derive optimized device design parameters from a modified design candidate, until a computed cost function value for the modified design candidate meets the determined target cost function value. A fabricator is configured to fabricate an optimized micro-fluidic device using the modified design candidate and the optimized device design parameters.

Further in accordance with present principles, described is a system for designing micro-fluidic devices. The system includes one or more processors including memory and a cost function calculator that determines a target cost function value based on selected input information relating to device design parameters including one or more of task, particles, system and design layout. The cost function calculator also computes cost function values for design candidates. Based upon the defined system parameters, a design candidate selector chooses one or more micro-fluidic device designs as design candidates based on a comparison between the design parameters of the one or more micro-fluidic device designs and the present device design parameters. The design candidate selector may also accept a user-input design candidate. A simulation model operator runs simulation models on one or more design candidates and identifies a best initial design candidate based on its computed cost function. An optimization routine operator modifies the best initial design candidate and optimizes the best initial design candidate by performing an optimization routine in which the design parameters of the best initial design candidate are modified to provide a modified design candidate having design parameters that differ from the parameters of the best initial design candidate. The optimization routine operator runs an optimization algorithm on the modified design candidate, and checks the cost function of the modified design candidate against the target cost function. The optimized design parameters of an optimized device design are forwarded as system output when the computed cost function of the modified design candidate meets the target cost function value. When the target is not met, then further optimization routines are performed.

Still further in accordance with present principles, described is computer program product for designing micro-fluidic devices, the computer program product comprising a non-transitory computer readable storage medium having program instructions embodied therewith, the program instructions being executable by a computer to cause the computer to perform a method in which a target cost function based on one or more of task, particles, system features, and design type as device design parameters is determined. The performance of one or more chosen design candidates is determined in a selected simulation model and a design candidate with a cost function closest to the target cost function is identified as a best initial design candidate. An optimization routine is run to modify design parameters of the best initial design candidate to provide a modified design candidate having design parameters that differ from the parameters of the best initial design candidate, and the cost function for the modified initial design candidate is computed. Optimized device design parameters of an optimized device design derived from a modified design candidate are returned when the modified design candidate has a computed cost function that meets the target cost function.

The optimization routine is repeated as necessary on the modified design candidate until the computed cost function for the modified design candidate meets the determined target cost function.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein:

FIG. 5 depicts a design of a device having an electrode layout in accordance with an embodiment of the present principles;

FIG. 6 depicts a simulation of flow through a device having the electrode layout of FIG. 5 in accordance with an embodiment of the present principles;

FIG. 12 shows two parts of an exemplary voltage configuration in a pixel-based electrode layout, separated based on the voltage applied to each pixel, in accordance with an embodiment of the present principles;

FIG. 13 shows the combined voltage configuration of the two parts shown in the exemplary pixel-based electrode layout of FIG. 12 in accordance with an embodiment of the present principles;

FIG. 17 depicts an example of a localized design issue to be solved in accordance with an embodiment of the present principles;

FIG. 18 depicts the simulation results of the example of a localized design issue shown in FIG. 17;

DETAILED DESCRIPTION

Figure 1:
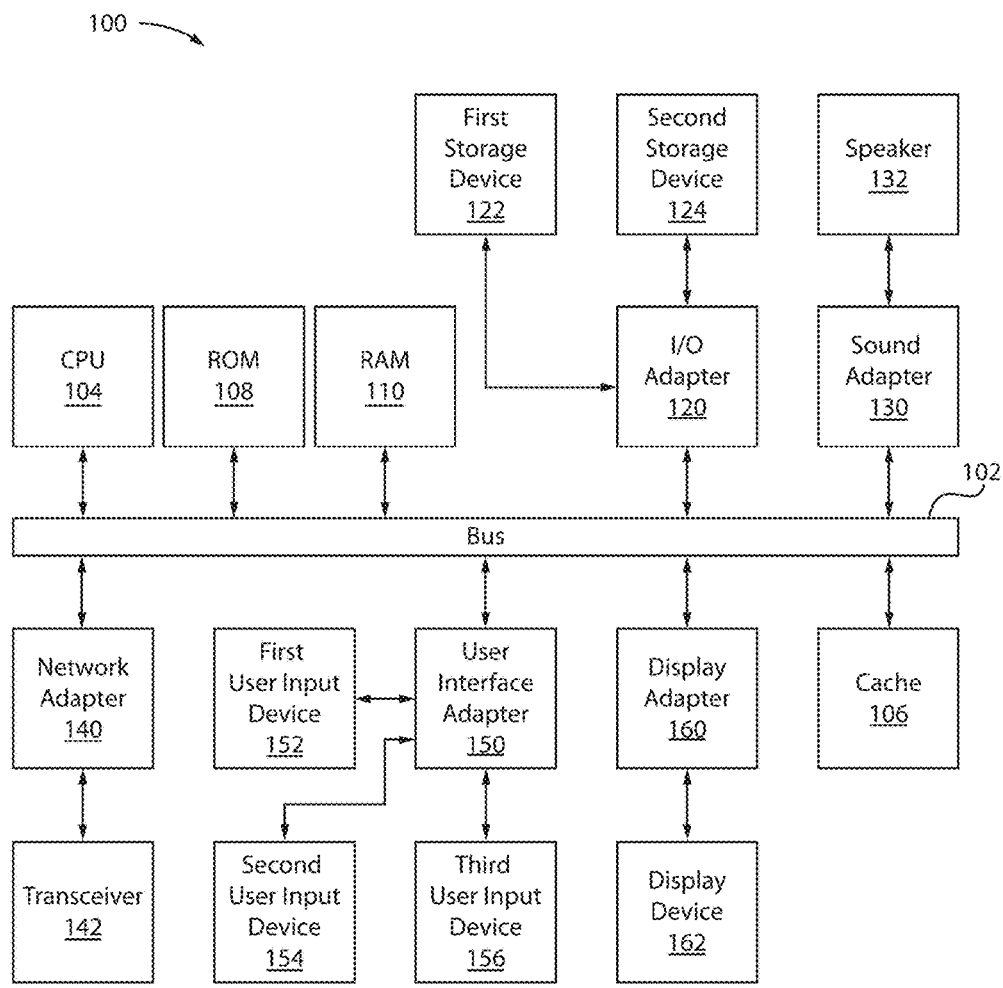
FIG. 1 shows an exemplary embodiment of a processing system to which the present principles may be applied.

According to an embodiment of the present principles, described is a method for designing micro-fluidic devices used in micro-fluidic processes in which component designs, e.g., micro-fluidic components and/or the electrodes employed in the devices are optimized. In accordance with the embodiments of the present principles described herein, design solutions that can be effectively fabricated, e.g., by accounting for material tolerances, the properties of the particles, and the properties of the fluids, to cite just a few examples, are realized. The design solutions may account for considerations such as the task to be performed on the fluid and/or the particles within the fluid, the particle concentrations within the fluid, and the particular considerations relating to the separation of particles, e.g., according to considerations such as particle kind, particle mass, and particle size.

Micro-fluidic devices are fabricated out of materials such as, for example, glass, silicon, poly(methylmethacrylate) (PMMA) and polydimethylsiloxane (PDMS), and are provided with microchannels in which fluid flows over metallic electrodes of a selected configuration that may be related to the geometries, dimensions, and sizes of the electrodes. Non-uniform electric fields generated by the electrodes influence the microparticles and cause them to become trapped, to separate, to assemble, to be transported, and to be characterized according to a number of properties.

Features of the components under design may initially be based the based on the layout of a device that is already in use, and through optimization the component may be designed to have attributes that maximize micro-fluidic device performance, e. g., through an optimized pattern or arrangement of one or more electrodes, dimensions of electrodes, and optimized flow path geometry and dimensions, to name but a few possibilities that may be addressed.

The systems and methods allow for the optimized designs that provide, for example, an electric field distribution in the device that maximizes the performance of the task for which the device is designed. In accordance with the embodiments of the present principles, the design features may be on the microscopic scale and may be on the nanoscopic scale. With regard to the task being performed, the dimensions of a particular feature may be on the order of a few nanometers to control electro-hydrodynamic effects within the device so as to manipulate the particles within the fluid in an intended manner, such as to separate particle populations into groups. For example, particles of different materials may be separated from each other, and particles of different sizes may be separated from each other. The device may be a dielectrophoretic device in which microparticle beads having sizes measured in micrometers are separated.

Manipulating a material, e.g., a particle or even a cell with dielectrophoresis occurs by creating an electric field gradient, such as by arranging metallic electrodes that are present in the micro-fluidic channels. The electrodes, which may be integral with the channels, may directly contact the particle- (or cell)-containing fluid flowing through the channels.

In one embodiment in accordance with the present principles, optimized electrodes employed in the micro-fluidic devices are designed. Such optimized electrodes may be expected to generate electric fields optimized for the task to be performed. Still further, other parameters such as the applied voltage amplitude, the signal frequency and/or the signal form (e.g., pulse width modulation (PWM), phase modulation (PM), sinusoidal, square or triangular, or a linear or non-linear combination of several voltage sources) applied to the electrodes may be accounted for. The geometries of the channels, down to microscale or even nanoscale, can be designed for optimal device properties, e.g., to optimize the flow profile through the device.

The design of a micro-fluidic device and its components, e.g., electrodes, channel layout (shapes, angles, dimensions, etc.) can be viewed as an optimization problem in which a cost function is maximized or minimized (as the situation calls for) under defined constraints. In one embodiment, the cost function is defined by the user. In another embodiment, the cost function may be system-selected based on the design parameters, which may be input by the user.

Device performance of a design candidate that is determined to be the best one to start with, e.g., a best initial design candidate selected from among a number of design candidates, is simulated. For example, fluid flow is simulated through the microchannel of a parametrized version of the best initial design candidate, which defines a set of design parameters, and by performing an optimization routine in which modified design candidates emerge in one or more optimization iterations, an optimized device design having optimized design parameters can be attained. In the optimization routine, algorithms such as genetic algorithms can increase the range in which variables relating to the parameters can be investigated. With this approach, it is possible that non-intuitive design solutions are produced.

Referring now to the drawings in which like numerals represent the same or similar elements and initially to FIG. 1, an exemplary processing system 100 to which the present principles may be applied is shown. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154 and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

The processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. It is to be appreciated that the terms processors and controllers can be used interchangeably herein. These and other variations of the processing system 100 are readily contemplated by one of ordinary skill in the art given the teachings of the present principles provided herein.

Figure 2:
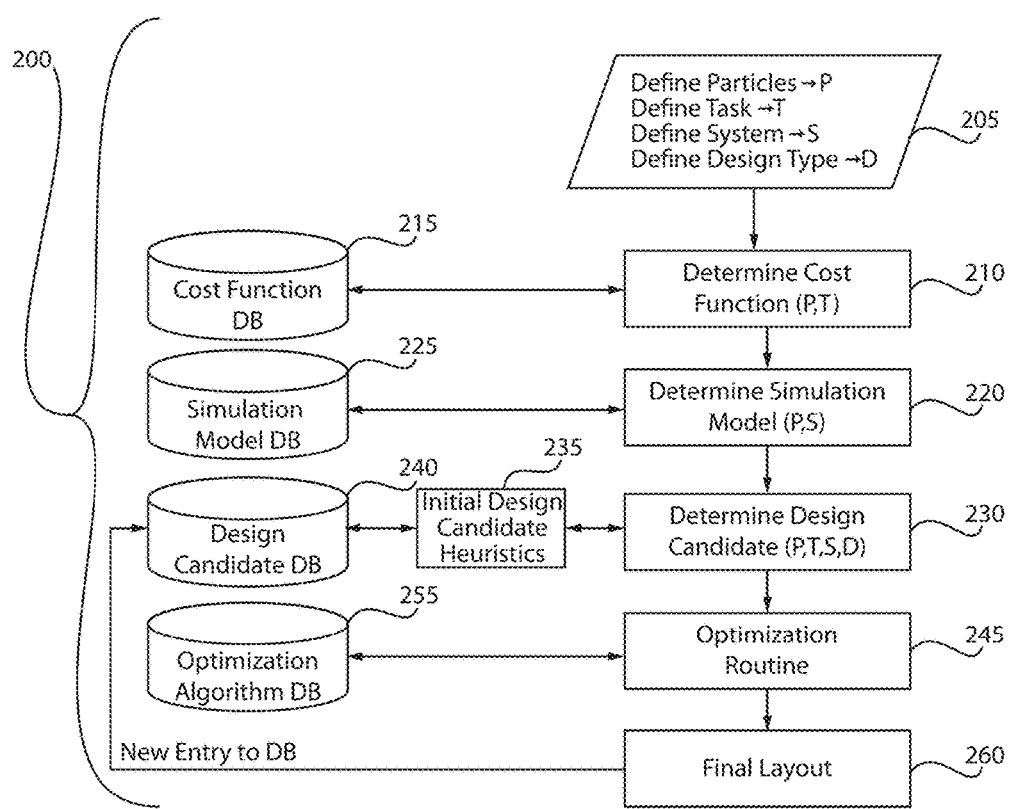
FIG. 2 depicts an exemplary embodiment of a method for designing a micro-fluidic device in accordance with an embodiment of the present principles.

FIG. 2 depicts a block flow diagram that illustrates an embodiment of a method 200 for designing a micro-fluidic device in accordance with an embodiment of the present principles. In block 205, a set of parameters are determined by the user. The parameters provide an initial working definition of the device that may vary in terms of the degree of detail, depending upon the extent of detail provided for each parameter and the number of parameters that the user defines. For example, one of the parameters relates to the task that is to be performed in the device. Another parameter relates to the materials that are processed in the device. The user may define the task, e.g., separating particles of different sizes, and may define particle properties, such as the kind of particles, the particle sizes, and the morphology of the particles.

The user may define the task to be optimized in a number of ways. By way of example, the task may be one of particle sorting, particle separation, particle trapping, and concentrating particles. Yet another user-defined parameter may relate to aspects of the system or device. Such parameters may include the materials of the device, and device design variables, such as the flow channel geometry, the flow channel dimensions, other aspects of device geometry and dimensions, the electrode geometries, the electrode dimensions, the electrode layout, the properties of the fluid transported in the device, voltages, signal frequency, operating temperatures, to name but a few examples.

The user may also define design layout type as a parameter. For example, the device may have a layout of polygons, e.g., two-dimensional polygon based layout, and the device may have pixel-based layout, among others. Two-dimensional polygon-based layouts are fabricated by way of depositing a thin layer of metal or conductive material on the device substrate, often the microchannel surfaces, and patterning the desired shapes on the metal/conductive material using device fabrication technology such as lithographic and etching methods. The defined electrodes, which are different from design to design, are connected to a voltage source through additional metallic/conductive wires and contacts outside the microchannel and can assume only one among a discrete set of voltage values at a time. A pixel based layout refers to an array or matrix of small separate (square) electrodes, fabricated with CMOS technology and individually addressable from below the surface. Each pixel is an electrode that can be independently activated to a certain voltage. The geometrical shape of the structure (a matrix of small square electrodes) does not change, but the distribution of voltages and, therefore the electric field generated, can be varied dynamically to perform different functions within the same device.

In block 210 the cost function is defined. The cost function may be defined by a cost function algorithm. In one embodiment, a cost function algorithm is selected from a cost function database 215. The selection may be made on the basis of the design parameters. In one embodiment, the cost function algorithm is based entirely or primarily on the task for which the device is being designed to do. In another embodiment, the user may define the cost function by creating a new cost function. New cost functions may then be stored in the cost function database 215 for use at another time. Further, a target cost function value is set. This is the value which represents the optimization of at least one device design parameter.

The cost function may be based on the system parameters, particle properties or type of layout platforms, in addition to being based on the target task to be performed. The particle properties determine the sign and strength of the dielectrophoretic (DEP) force that influence the particles, for instance, positive DEP and negative DEP, and this may influence on the final definition of the cost function. Hence, on a microfluidic device in which the electrodes are located at the bottom surface of the channel, when defining the cost function for the trapping of positive DEP particles, the cost function algorithm will maximize the number of particles near the electrode edges at the bottom of the channel, while in trapping negative DEP particles, the cost function algorithm will maximize particles levitating directly above the electrode centers near the channel top surface. The different DEP responses require a different cost function to account for differences in material properties or type.

The cost function may be defined in terms of a computed particle displacement in the channel (displacement may be lateral and/or longitudinal), and may be determined, e.g., calculated through physical models and numerical simulations for particular condition sets, such as a selected geometry, materials, shape, and voltage. The variables that are to be investigated and defined may be included in the cost function definition. Such variables may include particle positions at the channel entrance and the computed particle position at the channel exit. For example, to attain the most complete particle separation from among particles of two sizes, it may be desirable to design a device to attain the largest possible lateral displacement of the two kinds of particles moving in opposite directions. The cost function definition may be a cost function algorithm that expresses this design attribute. Such positions may be expressed three-dimensionally in a Cartesian coordinate system, e.g., x, y and z coordinates of the particles at channel entrance and/or channel exit. The user may define the target cost function value, or it may be set by the system.

The lateral displacement of a particle between the channel entrance and the channel exit may be maximized in the cost function algorithm. For example, if x is lateral position, then the lateral displacement would be $x_{exit}-x_{entrance}$, where the difference between $x_{exit}$ and $x_{entrance}$ is to be maximized.

There are other variable factors that may be included in the cost function definition. A non-exhaustive list of such cost functions include: the lateral displacement of a particle along a portion of the channel length, e.g., between two points along the length of a channel; the lateral displacement of a first particle type along a portion of the length of a channel; the lateral displacement of a second particle type along a portion of the same channel length; and the difference in the lateral displacement between the two particle types; and the weighted combination of lateral displacement differences for two or more particle types in the channel. Longitudinal displacement of particles may also be included in the cost function definition in accordance with the above described cost definition possibilities.

In block 220, simulation models are determined for the design project and selected for use. In one embodiment, the simulation models may be selected from simulation models database 225. In another embodiment, it may be user defined, and later stored in the simulation models database 225 to be used again at a later time.

With simulation modeling, a digital prototype of a physical model is generated to predict real world device performance through simulating the device in operation according to the design parameters. As an example, simulation modeling may be used to predict fluid flow and heat transfer patterns in micro-fluidic devices. There are different simulation models that may be employed. For example, the simulation model may be one of finite elements, finite differences, Lattice-Boltzmann and particle tracing. Software that may perform the simulation modeling include the commercially available Comsol Multiphysics® suite available from Comsol, Inc. and the open source openFOAM suite for computational fluid dynamics (CFD), available from OpenCFD, Ltd.

Simulating the trajectory of a microparticle flowing within a micro-fluidic device that contains integrated electrodes is useful in designing electrode and micro-channel configurations to achieve effects such as guiding, sorting and trapping of microparticles. In simulating the combined force generated by the electric field and hydrodynamic drag of the fluid in the microchannel and the computed effect on particle trajectory, the following equations may be relied on, and included in and run by the simulation packages in accordance with the embodiments of present principles:

$m\ddot{r}=F(r,\dot{r}) \rightarrow r=(x,y,z)$ (assuming steady state flow, with no flow deformation);

$$F_i = 6\pi R\eta C_w v_i + 2\pi R^3 \varepsilon_m CM \frac{\partial E^2}{\partial r_i}$$

where $F_i$ is net force along an axis coordinate $r_i$, where $r_i$=x, y, z;

Electric field $E=\hat{x}E_x+\hat{y}E_y+\hat{z}E_z$; and

Flow speed $v=\hat{x}v_x+\hat{y}v_y+\hat{z}v_z$;

where, in the above equations,
R is particle radius;
η is particle viscosity;
$C_w$ is the wall correction factor;
$\varepsilon_m$ is medium permittivity; and
CM is the Claussius-Mosotti coefficient.

Referring to FIG. 5, shown is a simulation layout of device 10 having a channel 12 with walls 14. Electrodes 20 of a metallic material are deposited on the channel walls and other device surfaces. The direction of flow through the device 10 is shown by the arrow.

In FIG. 6, the flow of 5 μm particles and 10 μm particles is simulated in the device 10 as they are influenced by the dielectrophoretic force produced by the electrodes 20. Under the influence of the force generated by the electrodes, the 10 μm particles are simulated as travelling flow paths 18 that converge towards the center of the channel 12. The 5 μm particles are simulated as travelling flow paths 16 positioned near the side of the channel 12, close to walls 14, not strongly influenced by electrodes 20. This kind of behavior has been observed in experimental data, and would be accounted for in the simulation models.

Referring to FIG. 2 block 230, the design candidates are selected. The design candidates may be an initial guess at a design candidate. The design candidates may be selected from a design candidate database, using the defined task, particles, system and design type as input parameters, the defined cost function and the defined simulation model.

The best first guess, e.g., the best initial design candidate, may be defined by a user who may define the parameters and other variables of a first guess at a design. The defined parameters and variables may include electrode features, e.g., geometry, dimensions, and layout, channel features, e.g., geometry, dimensions, and layout, and other features. In an alternative embodiment, one or more initial design candidates may be evaluated for which one is best in accordance with the initial design candidate heuristics approach of block 235.

Figure 3:
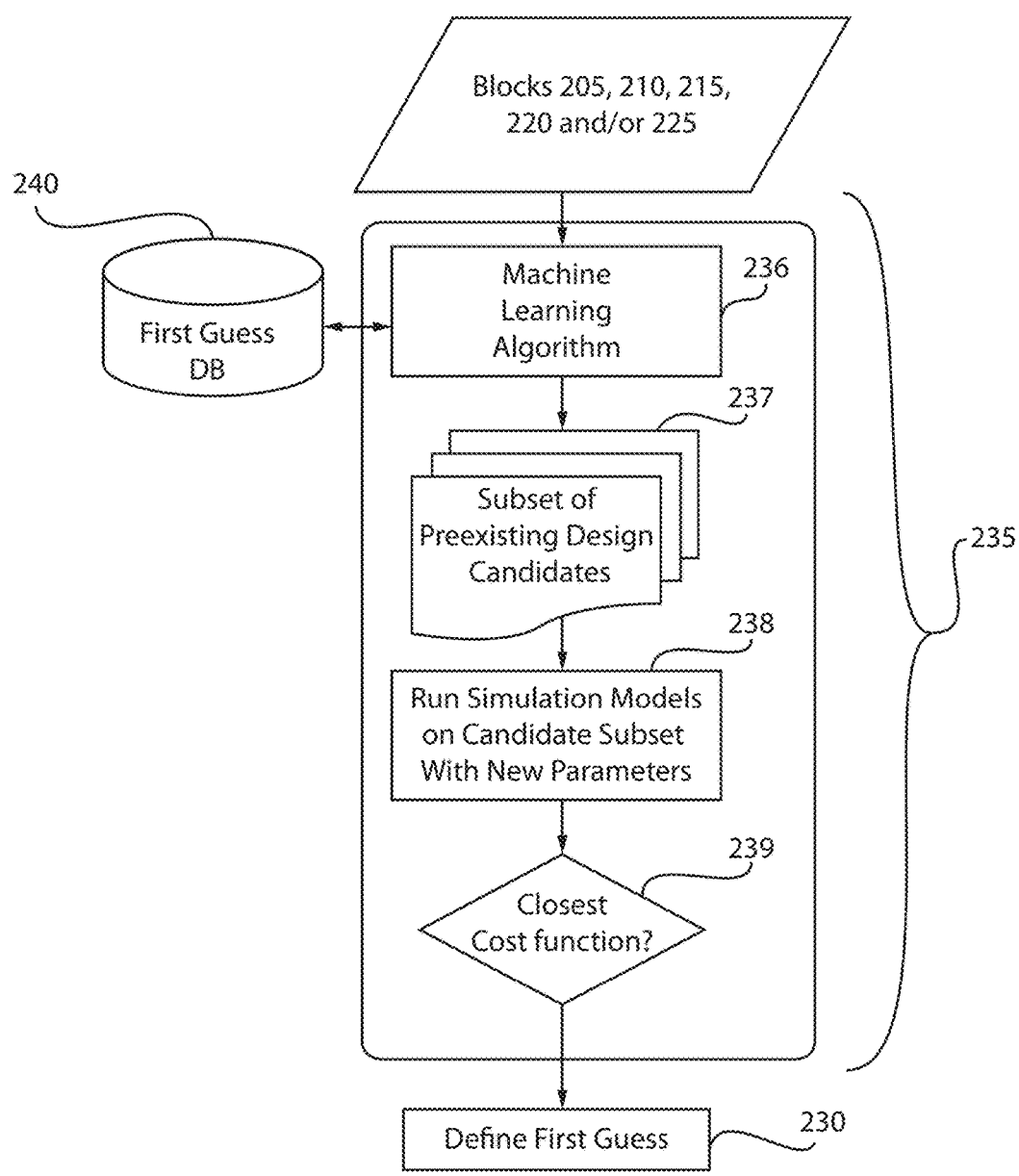
FIG. 3 depicts an aspect of the FIG. 2 method for designing a micro-fluidic device in accordance with an embodiment of the present principles.

FIG. 3 illustrates the particulars of the initial design candidate heuristics approach of block 235 of FIG. 2. In this approach, machine learning methods using algorithms 235 may be employed to classify the initial design candidate entries from the design candidate database of block 240 so that for a new set of particle, task, system and design type (P, T, S, D), a subset of preexisting design candidates, previously optimized for systems having similar parameters P, T, S, D may be selected and identified in block 237.

In block 238, a simulation model is run on the subset of design candidates identified in block 237, and the cost function is computed for each candidate. The heuristics calculates the value of the cost function for a subset of candidate designs and selects that which has a value closest to the cost function target, which will be used as the initial design candidate, e.g., the first guess, used to initialize the optimization loop in block 245.

In block 239, the initial design candidate that produces the cost function value closest to the target is selected as the best initial design candidate to be subjected to a new optimization run that is performed in block 245. This approach can be applied to polygon type design layouts and pixel-based design layouts.

Referring back to FIG. 2, and to block 245, an optimization routine is performed. The optimization routine may be an iterative one in which design topology is modified after running an optimization algorithm, either one that is newly created or one that has been selected from a database 255 of optimization algorithms.

Figure 4:
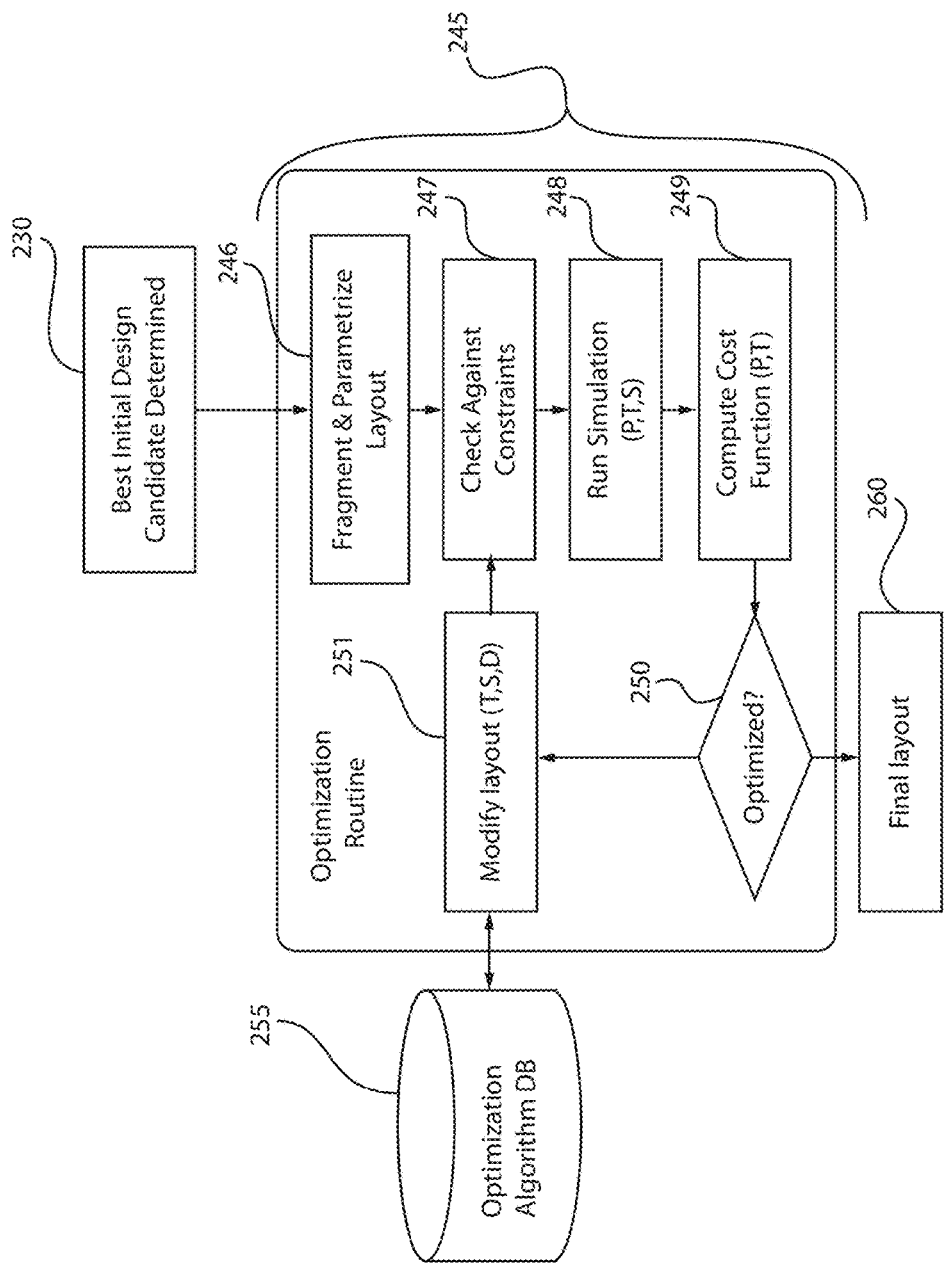
FIG. 4 depicts another aspect of the FIG. 2 method for designing a micro-fluidic device in accordance with an embodiment of the present principles.

FIG. 4 illustrates in greater detail the optimization routine of block 245. As shown, the block 245 and its subparts 246, 247, 248 249, 250 and 251 concern the running of an optimization algorithm obtained from optimization algorithm database 255. In block 246, the layout of the best initial design candidate is fragmented and parametrized into variables for optimization based on the first guess defined in block 230. Fragmentation and parametrization may be based on the type of design or layout that was chosen in block 205, e.g., whether the layout was a 2-D polygonal layout or a pixel-based layout. Fragmentation and parametrization are used to define an arbitrary geometry within the chosen design layout (pixel-based or 2D-polygon). Fragmentation relates to the representation of an arbitrary geometry in a pixel-based layout, e.g., "pixelation". Parametrization, on the other hand, involves obtaining the y=mx+b expressions of the lines that define the contour of the 2D polygons.

In block 247, the intermediate solution obtained in block 245 after fragmentation and parametrization is checked against constraints that are defined by the task T. Particle trajectory, geometric limitations, limitations imposed by device materials, e.g., limitations resulting from fabrication issues and materials issues, and robustness of the design specification, are a few examples of the design constraints that may be accounted for. "Robustness" refers to design adjustments that make device performance less sensitive to changes due to manufacturing variability or changes in the operation conditions, such as temperature and flow rate or design safeguards that avoid undesired effects such as preventing particle clogging from occurring.

In block 248, simulations are run on the modified design candidate that results from the fragmentation and parametrization of the best initial design candidate. A cost function is computed in block 249 for the modified design candidate. The simulation models may be the simulation model determined for use in block 220. For example, the simulation model defined in 220 may use the hydrodynamics equations that govern laminar flow of a fluid inside a channel, with dispersed particles in the fluid. The computation of the cost function involves, for instance, the position of such particles. In the loop of block 245, the simulation of block 248 is a hydrodynamics simulation run to make the calculation of the value of the cost function in block 249. Thus, the simulation model to be used is defined in block 220 (or selected from a database (block 225)). During the optimization routine (and previously during the initial design candidate heuristics in block 235) the chosen simulation model is used. In the optimization routine it is repeatedly used in the loop of block 245, to simulate the behavior of each new design iteration and to compute the cost function.

In block 250, the value of the cost function obtained for the modified design candidate is compared to the desired target for cost function. If the desired target is not achieved by the cost function of the latest iteration of the modified design candidate, the modified design candidate is again modified, e.g., one or more of the parameters are modified in block 251, as determined by the optimization routine subject to the particulars of task T, system S and design type D of the device.

Block 251 performs a subroutine that modifies the design layout as part of the optimization routine of block 245. The subroutine makes changes to the layout in a manner intended to approach optimal design. In the case of genetic algorithm applied to a pixel-based layout, for example, the modify layout subroutine of block 251 may randomly change the voltage of an electrode, and then, upon performing another loop in block 245, determine whether device performance is improved or not. In the case of a 2D-polygon based layout, the modifications may consist of shifting a polygon edge in a random amount and in a random direction. Again, as indicated, following the layout modification, the next steps of the optimization routine, e.g., actions of blocks 247, 248, and 249 are performed again.

When the cost function computed in block 249 meets the cost function target in block 250 within a predetermined margin, either with the first or a subsequent iteration of a modified design candidate, then the optimization routine ends and a set of optimized design parameters of an optimized device design 260 is returned, e.g., a device design optimized to perform according to the defined parameters.

The optimization algorithm database of block 255 may contain a set of unique algorithms capable of returning non-intuitive solutions. Examples of such algorithms include genetic algorithms and particle swarm optimization (PSO) algorithms, Monte Carlo algorithms, and Conjugate Gradient algorithms.

Further, the set of optimized design parameters of an optimized device design obtained through the optimization routine may be stored in the design candidate database of block 240 for use in a subsequent optimization of a design of a micro-fluidic device. Future optimizations can be improved by using the optimized device design parameters to train and guide the initial design candidate heuristics of block 235.

In block 245, the optimization loop may run continuously until all optimization criteria in are met. For example, in block 250 a threshold of 5% of the cost function target may be set and the instruction may be to stop the optimization routine when that target is achieved. In another variation, the optimization routine may be set to a maximum number of routines, e.g., 20 iterations where the process proceeds through block 245, e.g., blocks 251>247>248>249>250 (then back to 251) twenty times, upon which the output 260 would be given with indication in the case the 5% threshold is not met. If not met then the user has the option to adjust the input parameters to narrow down the parameter search space and facilitate convergence of the optimization algorithm.

An example of the above described embodiment in accordance with present principles is now provided, with regard to optimizing an electrode layer to perform the task T of separating two types of intermingled particles: 10 μm diameter spherical polystyrene (PS) microparticles and 5 μm diameter polystyrene (PS) microparticles. Here:

P (particle) is 10 μm and 5 μm diameter spherical polystyrene (PS) microparticles;

T (task) is separating the particles P;

S (system) is 400 μm×15 μm channel cross section, 1 mm/s flow velocity, 20 Vpp of voltage amplitude and 100 MHz sinusoidal waveform; and D (design) is polygon based.

Cost function is defined as the difference in lateral displacement (Δx) of each particle type at the channel exit, with each particle type being at the same location at the channel entrance. Cost function f(u) is:

$$f(u) = \frac{1}{M}\sum_i (\Delta x^{(i)}_{10\,\mu m}(u) - \Delta x^{(i)}_{5\,\mu m}(u))$$

where M is the number of particles, e.g., beads, that are tracked, $u \equiv (u_1, \ldots, u_n)$ is the parameter vector, which is the list of design parameters that may be modified or varied to find an optimum design. For example, in a polygon-based layout, parameter vector may be the various polygon side dimensions, coordinates, inclination angles and others. In a pixel-based layout, parameter vector may be the voltage value of some or all the pixel electrodes in the array. For i, taking any value from 1 to M is the index assigned to each individual particle used to calculate the cost function value.

Figure 7:
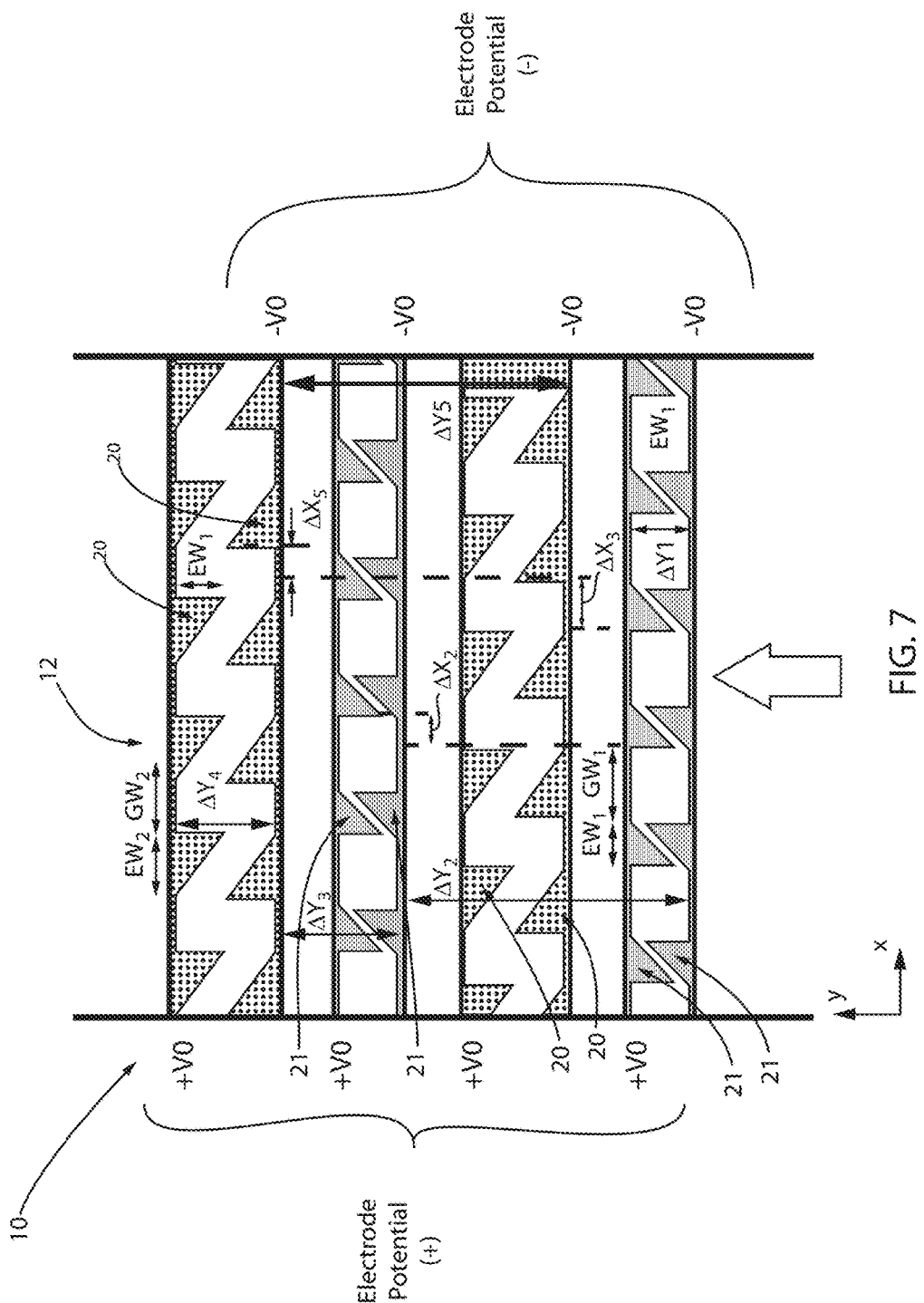
FIG. 7 depicts an exemplary embodiment of a first guess and design parameters that may be optimized in accordance with an embodiment of the present principles.

FIG. 7 depicts an initial electrode layout of a best initial design candidate to be used in optimization. The electrodes 20, 21 are in a polygon-based layout, located on a channel 12 surface. The device 10 is to perform the task of separating two particle populations, e.g., 5 μm spherical particles and 10 μm spherical particles that are suspended in a fluid. The arrow shows that flow runs through the device from the bottom to the top.

The initial electrode layout as an initial design candidate is formed of electrode shapes that are selected from a library. The dimensions and geometries of the electrodes are parametrized, e.g., broken into dimensions and geometric shapes that can be adjusted and modified in the optimization routine. As shown, the initial arrangement includes two sets of electrode pairs 20, 21 having a periodically repeating triangular shape. The lateral distance between adjacent electrode pairs 20, 21 is defined, as shown by $\Delta X_2$ and $\Delta X_3$. In each pair of electrodes, one electrode of the pair is connected to a negative voltage source (−VO) through an electrical connection leading outside the device, such as a wire, and the other electrode of the pair is connected to a positive voltage source (+VO), in a similar manner (the electrical connections are not shown). The electrodes 20, 21 are further parametrized into segments. As shown, the channels are also defined in terms of longitudinal length segments $\Delta Y_1$, $\Delta Y_2$, $\Delta Y_3$, $\Delta Y_4$ and $\Delta Y_5$. Channel portions $\Delta X_2$, $\Delta X_3$ and $\Delta X_5$ define lateral length segments. Electrode parameters $EW_1$, $EW_2$, and $GW_1$, $GW_2$ define electrode dimensions. EW refers to the width of the triangular electrode side and GW is gap width, e.g., the width of the gap between electrode triangular features.

The figure depicts a situation simplified for present discussion purposes in which two parameters, e.g., $\Delta X_2$ and $\Delta X_3$ are varied, and thus $u \equiv (\Delta X_2, \Delta X_3)$. The optimization problem is defined as maximizing the lateral separation between the two particle types at the exit of the channel section when they entered the section at the same position. The selected optimization algorithm modifies the vector of parameters (u) until the maximum value of $f(u)$ is attained. The maximization of $f(u)$ is achieved with constraints:

$$0 < \Delta X_2 < EW_1 + GW_1$$

$$0 < \Delta X_3 < EW_2 + GW_2$$

Fluid dynamics and electrical field models are employed as simulation models to simulate performance in different structures. Such models may be in the Comsol Multiphysics® simulation model suite. In the current example, these simulation models are directed to polystyrene particles in a saline buffer solution in a silicon microchannel, with learned details integrated from prior simulation runs and experimental data.

Figure 8:
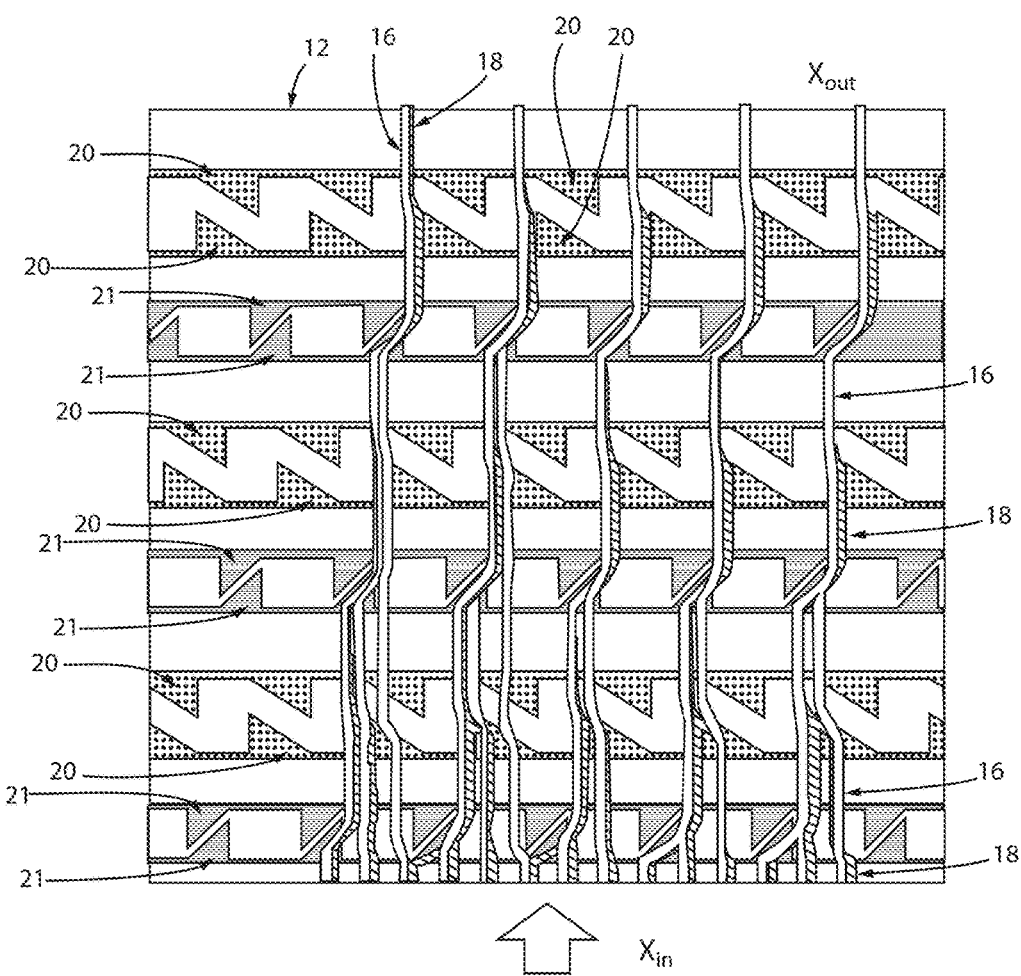
FIG. 8 depicts an exemplary embodiment of simulated particle trajectory results of a first guess of a micro-fluidic device design in accordance with an embodiment of the present principles.
Figure 9:
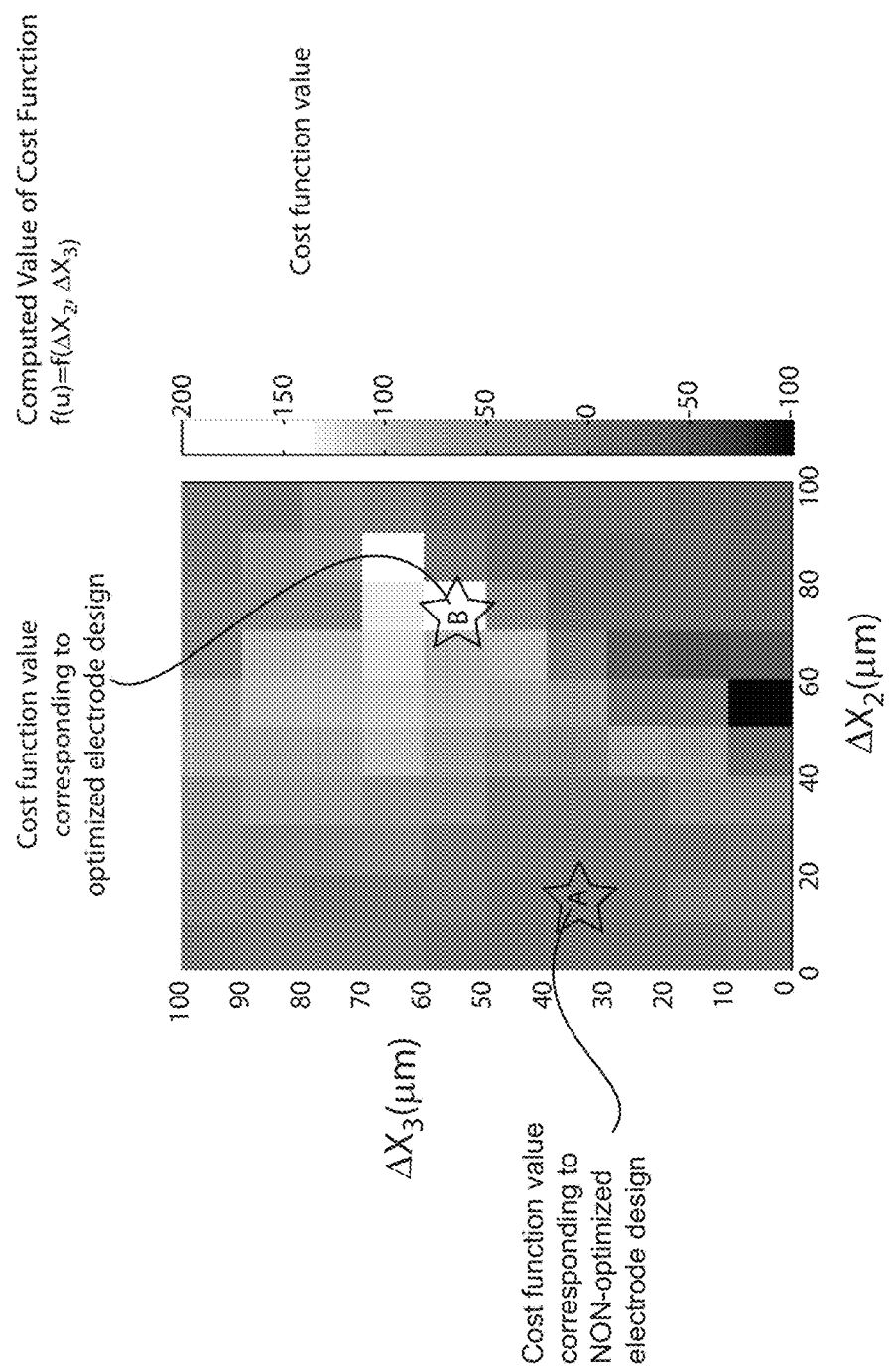
FIG. 9 depicts an exemplary embodiment of plot of the optimization cost function, defined as the difference in lateral displacement of two kinds of particles flowing in the microchannel over the electrodes, for a range of values of two optimization variables, $\Delta X_2$ and $\Delta X_3$, in accordance with an embodiment of the present principles.
Figure 10:
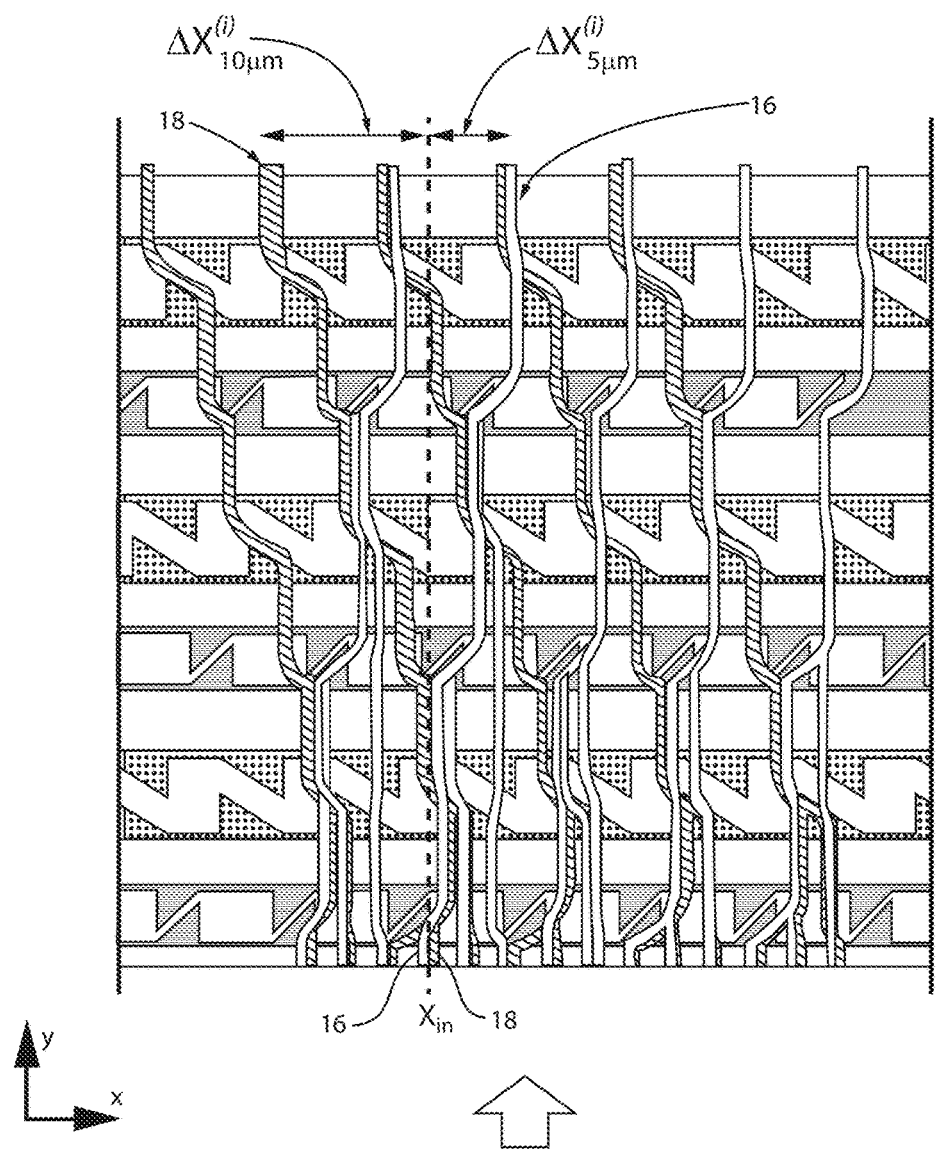
FIG. 10 depicts an exemplary embodiment of the simulated particle trajectory results of an optimized micro-fluidic device design based on FIG. 8 and FIG. 9 in accordance with an embodiment of the present principles.

FIGS. 8, 9, and 10 depict the eventual maximization of lateral displacement of particle types at the channel exit. FIG. 8 depicts the results of numerical simulations of the expected flow paths 16 and 18 that 5 μm particles and 10 μm particles will take respectively, which are suspended in a fluid as they flow through the channel 12 of the device from bottom to top, in accordance with the arrow. In the simulation model of FIG. 8, it is determined that the maximum possible particle separation $f(u)$ is not attained, owing to an electrode design has not been optimized to achieve a maximum separation of the population of 5 μm particles and 10 μm particles. As shown in FIG. 8, the simulation performed predicts that at the exit of the channel section shown, the lateral position of a particle, that is, $X_{out}$, that entered the channel section at a lateral position $X_{in}$, overlap for both 5 μm and 10 μm diameter particles. In other words, the flow paths 16 and 18 will overlap for each other, resulting in little to no separation of the 5 μm particles and 10 μm particles. The simulations may be performed using the finite element Comsol Multiphysics® solver using fluid dynamic and electrical field models prepared for polystyrene (PS) particles and a saline buffer solution in a silicon microchannel, with calibration being based on prior experiments.

In one embodiment, the optimization routine may take a brute force approach to searching for an optimized geometrical configuration of the best initial design candidate electrodes that satisfies the target cost value function $f(u)$, which is the difference in the lateral displacement $(\Delta x)$ for each particle type between the channel entrance and the channel exit. In a brute force optimization algorithm, all possible combinations are tried until the optimization target is reached. Brute force uses a direct search for the maximum (or optimum) value made by iteratively stepping through the possible combinations of design parameters and calculating $f(u)$ for each combination. Brute force optimization is just one example of the kind of approach that may be taken to optimization and the design and selection of the optimization algorithms.

In FIG. 9, an optimization routine is performed using an optimization algorithm that looks for an optimized lateral separation of the 5 μm PS particles and 10 μm PS particles as they move through the channel, under the influence of the electric fields generated in the electrodes 20, 21. In the figure, the value of cost function $f(u)$ as a function of the variables $\Delta X_2$ (x-axis) and $\Delta X_3$ (y-axis) is plotted, each in a range of 0 μm-100 μm. Point A on the plot is the case shown in FIG. 8, in which electrode design is not optimized. Point B on the plot corresponds to the optimized electrode design of the device of FIG. 10, where cost function is determined to be at a maximum possible value within the constraints. Varying the values of $\Delta X_2$ and $\Delta X_3$ yields different cost function results. The "A" star shows the values of $\Delta X_2$ and $\Delta X_3$ of FIG. 8, which is non-optimized, as the device design does not separate the 5 μm and 10 μm particles. The "B" star shows the optimized values of $\Delta X_2$ and $\Delta X_3$, which is shown on FIG. 10 as the maximum screening distance between 5 μm and 10 μm particles, and represents the desired optimized outcome. As shown in FIG. 10, depicting the results of numerical simulations of the expected flow paths 16 and 18 that 5 μm particles and 10 μm particles will take respectively, the 5 μm and 10 μm particles enter the channel 12 at the same location $X_{in}$, and then separate at the device exit, e.g., where 10 μm particle flow path 18 ends, and where 5 μm particle flow path 16 ends.

Figure 11:
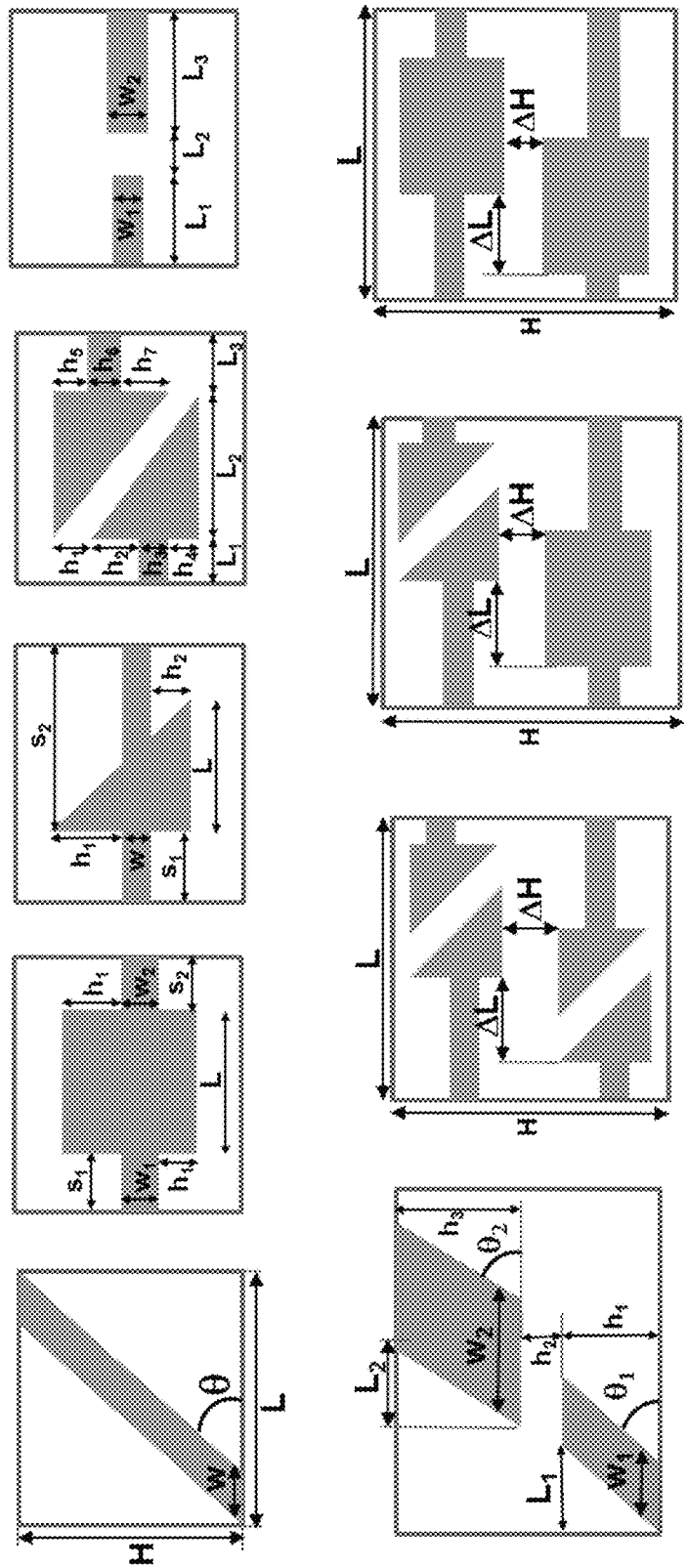
FIG. 11 depicts exemplary embodiments of electrode dimensions and geometries that may be employed in micro-fluidic device designs in accordance with an embodiment of the present principles.

FIG. 11 depicts several candidates for electrode layout geometries, which may be used individually or in combinations. Different arrangements may be stored in the databases (e.g., in the database defined in block 240 of FIG. 3). Shown are arrangements of constant width, arrangements that incorporate larger electrode regions (e.g., squares, triangles, and combinations of one or more shapes). Optimization and simulation modeling may call one or more of these arrangements from the database and execute several different combinations to arrive at an optimized design based on the defined system parameters.

FIG. 12 depicts another embodiment in accordance with the present principles depicting a pixel-layout design type in which a pixelated digital configuration of arrayed electrode units provides a canvas for imaging the optimization of a device design. In the pixelated canvas, localized features and aspects of the design may be explored with further detail by modifying the voltage arrangement of each electrode rather than the geometry, which remains fixed. For example, the microchannel bottom where electrodes are arranged can be depicted virtually in a matrix of pixels, shown as small squares in the figure and following figures. Changes to the design in this pixel-based layout mean changes to the voltage configuration of the electrode array. The voltage of each electrode-pixel may be adjusted to optimize the performance of the task. Through the iterative optimization process, the voltage design can be improved until an optimized configuration is obtained, based on the computational requirements and design considerations. With pixelated layout, the initial designs are not restricted to a library set, and may be based on a completely arbitrary selection of the voltage assigned to the pixels. Reconfiguration to a desired cost function and dynamic reconfiguration during device operation may be realized with the same device. Prototyping several different designs and executing different analyses (e.g.: optimization for red blood cell screening and then white blood cell screening, using the same sample), may be possible with a single device.

The size and shape of each virtual electrode-pixel may be adjusted as needed, for design refinement and for needs of the computations. The voltage of each electrode in the array can be addressed individually and defined while accounting for device characteristics when the output of the optimization is to be applied to a physical electrode array. In some embodiments, the pixel-based layout of the electrodes may be converted to a polygon-based layout having a known and discrete set of voltages.

In one example, each electrode pixel may take one of three voltage values: +V0, −V0 and 0 Volts (e.g., ground or off). Based on the optimization algorithm, the optimization routine may turn the pixels of the matrix +V0, −V0 and/or off, during the process of optimization, until cost function is satisfied. FIG. 12 depicts an example in which the voltage assigned to each virtual electrode pixel in the array is one of +V0, shown as 30, −V0, shown as 32, and 0 Volts, shown as 34. The upper left pixel array shows pixels with +V0 (30) and 0 volts (34). The lower left pixel array shows pixels with −V0 (32) and 0 volts (34).

In FIG. 12, the electric field distribution generated by the electrode array is determined by the configuration of voltages assigned to each electrode pixel and, thus modified in accordance with the voltage applied without changing the electrode geometry. For example, where the voltage is a plus value (+V0) (30), a minus value (−V0) (32) or ground (0V) (34), with an alternative current (AC) signal of several MHz, the optimization routine controls the pixels, e.g., operating the +V0, −V0 and ground pixels by turning them on and off to arrive at a pixel arrangement that represents a customized configuration of voltage states, e.g., a customized electric field distribution that satisfies the target cost function. The modification of design by pixel manipulation, e.g., turning pixels on and off, may be controlled by the optimization algorithm, with optimization algorithms being performed until the design is optimized, as shown in FIG. 13, which depicts the combined +V0, −V0 and ground pixel arrangements in an optimized voltage configuration producing the desired electric field configuration.

The final optimized voltage configuration consists of pixels representing positive voltage regions and negative voltage regions, and in one embodiment in accordance with present principles, the final configuration may be used as input to a micro-fluidic device comprising a matrix of electrodes, in which a range of voltage values are available to each pixel and are adjusted based on factors such as device characteristics. Alternatively, the pixel-based voltage layout output can be converted to a polygon-based layout to be transferred onto a conducting layer on the channel surface.

Figure 14:
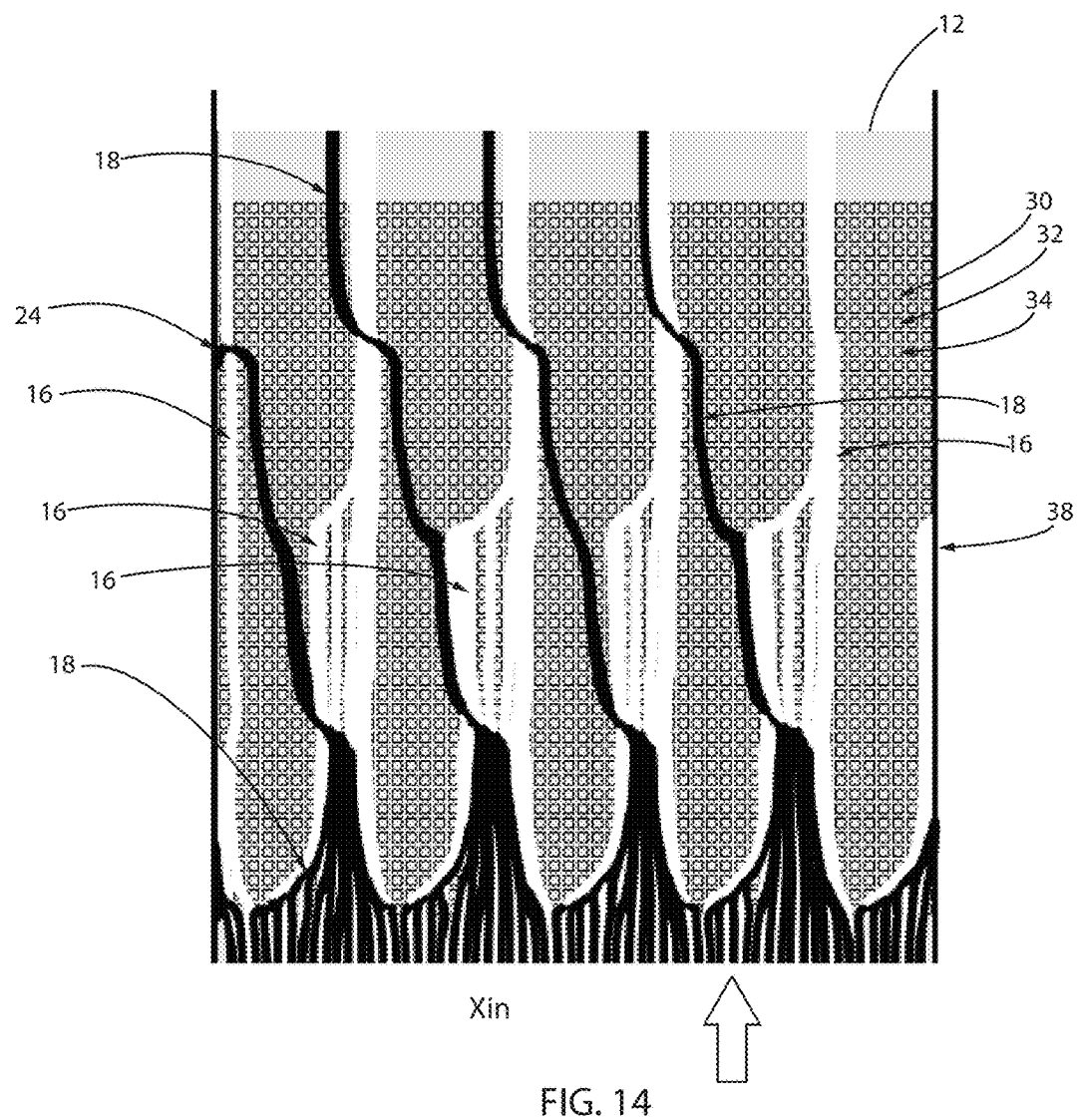
FIG. 14 depicts the results of simulations of a design showing the expected flow paths for 5 μm and 10 μm particles suspended in a fluid in accordance with an embodiment of the present principles.
Figure 15:
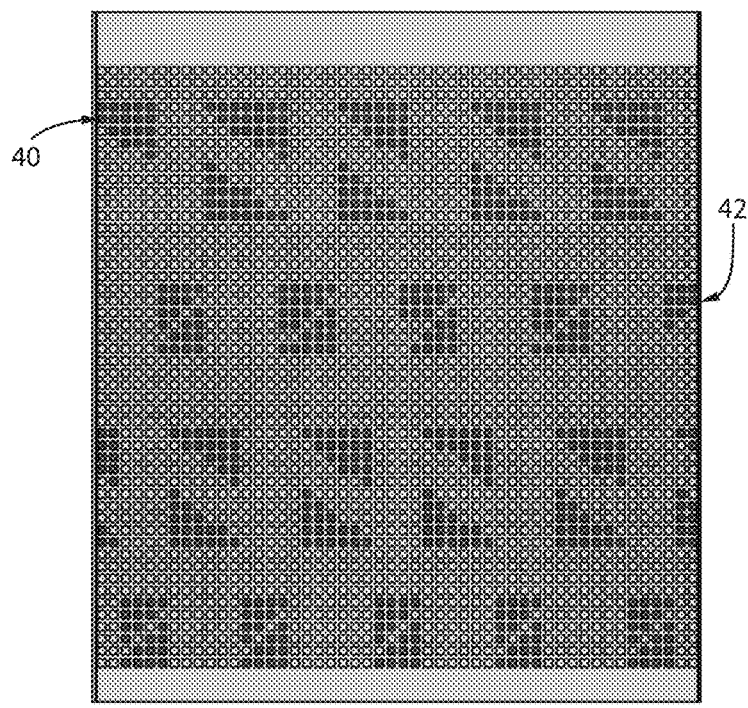
FIG. 15 depicts the results of an optimization routine in a pixel-based design layout in which voltage is adjusted locally in electrode regions in order to arrive at a solution to an issue raised in the FIG. 14 design, in accordance with an embodiment of the present principles.
Figure 16:
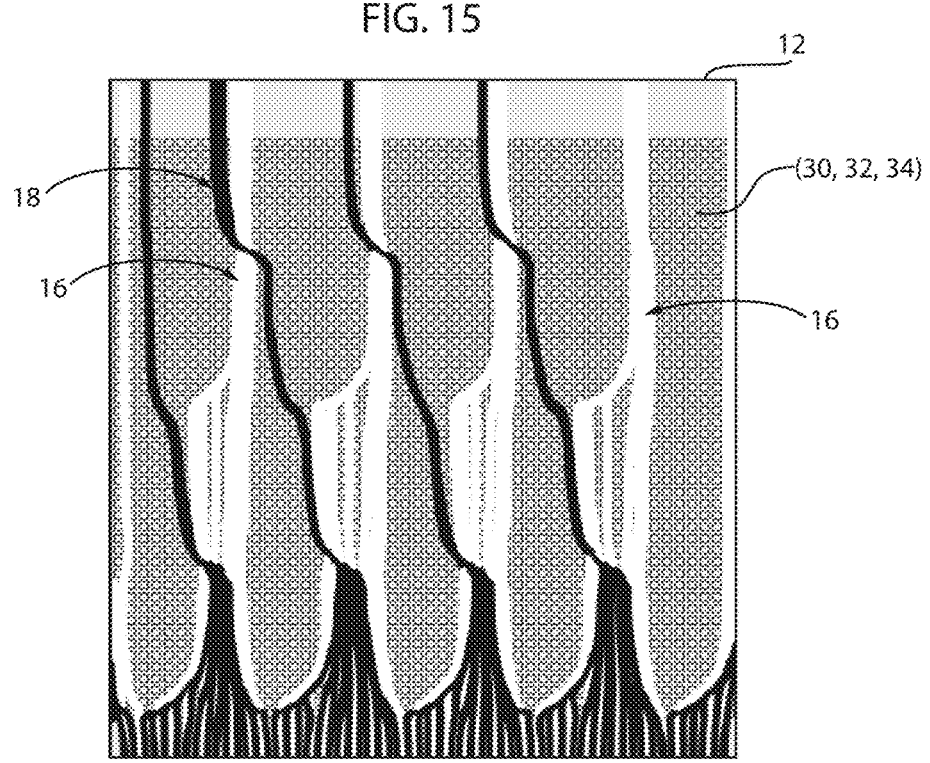
FIG. 16 depicts the results of simulations of an optimized design showing the expected flow paths for 5 μm and 10 μm particles suspended in a fluid, using the pixel-based layout of FIG. 15, in accordance with an embodiment of the present principles.

FIG. 14 shows simulations of the expected flow paths 16 and 18 for 5 µm and 10 µm particles respectively, in a device in which the particles are suspended in a fluid flowing from bottom to top through the microchannel 12, in accordance with the flow direction arrow. In simulations, the 5 µm diameter particles and the 10 µm diameter particles are each displaced laterally in opposite directions as they move through the channel section that is provided with the electrodes. On running particle flow simulations to determine predicted particle flow paths, the design of FIG. 14 is found to have unwanted localized particle trapping sites 24 (10 µm diameter particles) and 38 (5 µm diameter particles). The pixelated depiction of electrodes in the optimizing routine allows for an electrode design in which the voltage configuration is adjusted locally on a pixel-by-pixel basis in order to eliminate this outcome. As shown in FIG. 15, voltage is adjusted locally in electrode regions 40, 42, which eliminates the trapping problem. FIG. 16 shows the design for which simulations predict that the particles flow without trapping.

FIGS. 17 to 21 depict aspects of a device designed in accordance with the present principles. In an initial design shown in FIG. 17 and simulation runs shown in FIG. 18 a trapping issue is identified near the device exit, in which particles 22 get trapped at site 24 near wall 14 of the channel 12, as the flow moves as shown by the arrow (e.g., from right to left). Problems such as particle trapping may be related to a number of issues, such as undesired electric field gradient formation, creating an unexpected dielectrophoretic trapping effect or a wrong particle trajectory that ends at a wall or some other physical structure that may present a mechanical barrier. Such problems may be related to an electrode design 20 that may be corrected through optimization.

FIG. 18 depicts the results of numerical simulations of the expected flow paths 18 of the 10 µm particles. The particles, influenced by the dielectrophoretic force produced by the electrodes 20, are suspended in the fluid as it flows from right to left. The flow paths generated by the simulation models predict the trapping problem 24, which is due to the influence of the electrodes on the particles and thus the electrode design should be corrected.

Figure 19:
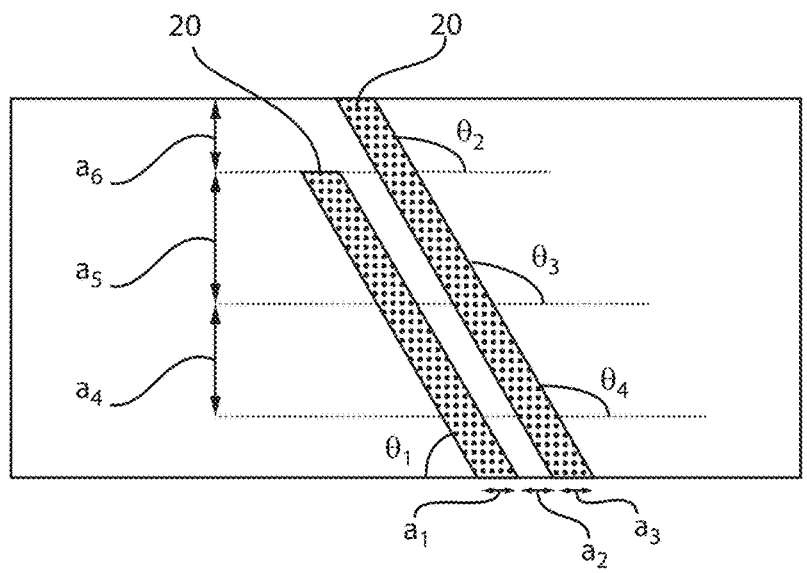
FIG. 19 depicts the parametrization of a design layout to be employed in solving the localized design issue of FIG. 17 in accordance with an embodiment of the present principles.

FIG. 19 depicts the electrodes 20 that cause the trapping problem. To arrive at an optimized electrode design, the original layout of the electrodes 20 is fragmented and parametrized in order to eventually determine the electrode dimensions and geometries of a design that reduces or eliminates particle trapping. For example, the electrodes 20 are shown as being parametrized into segments $a_1$, $a_2$, $a_3$, $a_4$, $a_5$, $a_6$, $a_7$ and $a_8$, and further, as extending linearly, in parallel with each other, along angle θ in which $\theta_1 = \theta_2 = \theta_3 = \theta_4$.

Figure 20:
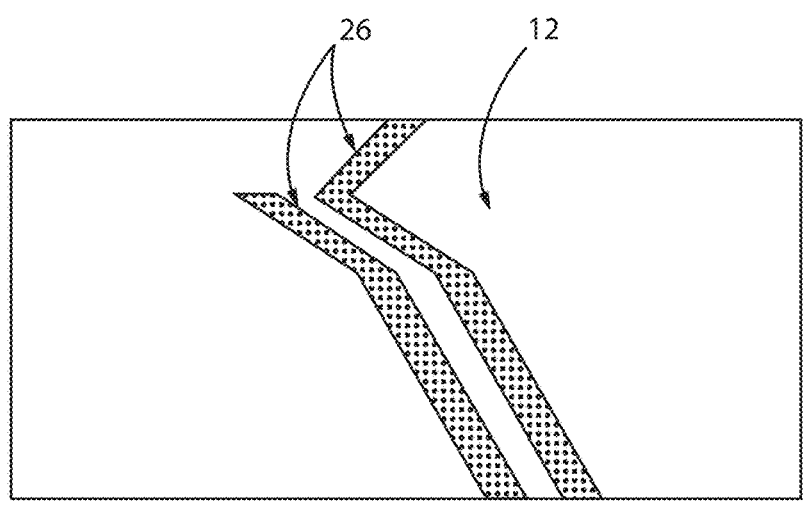
FIG. 20 depicts the final optimized design layout for solving the localized design issue of FIG. 17 in accordance with an embodiment of the present principles.

As shown in FIG. 20, the optimization routine changes the geometry and/or dimensions of the electrodes and produces optimized electrodes 26. The optimization algorithm changes angles $\theta_3$ in the electrodes 26 for segments $a_5$ and angle $\theta_2$ is changed for segment $a_6$ for the electrode 26 on the right.

Figure 21:
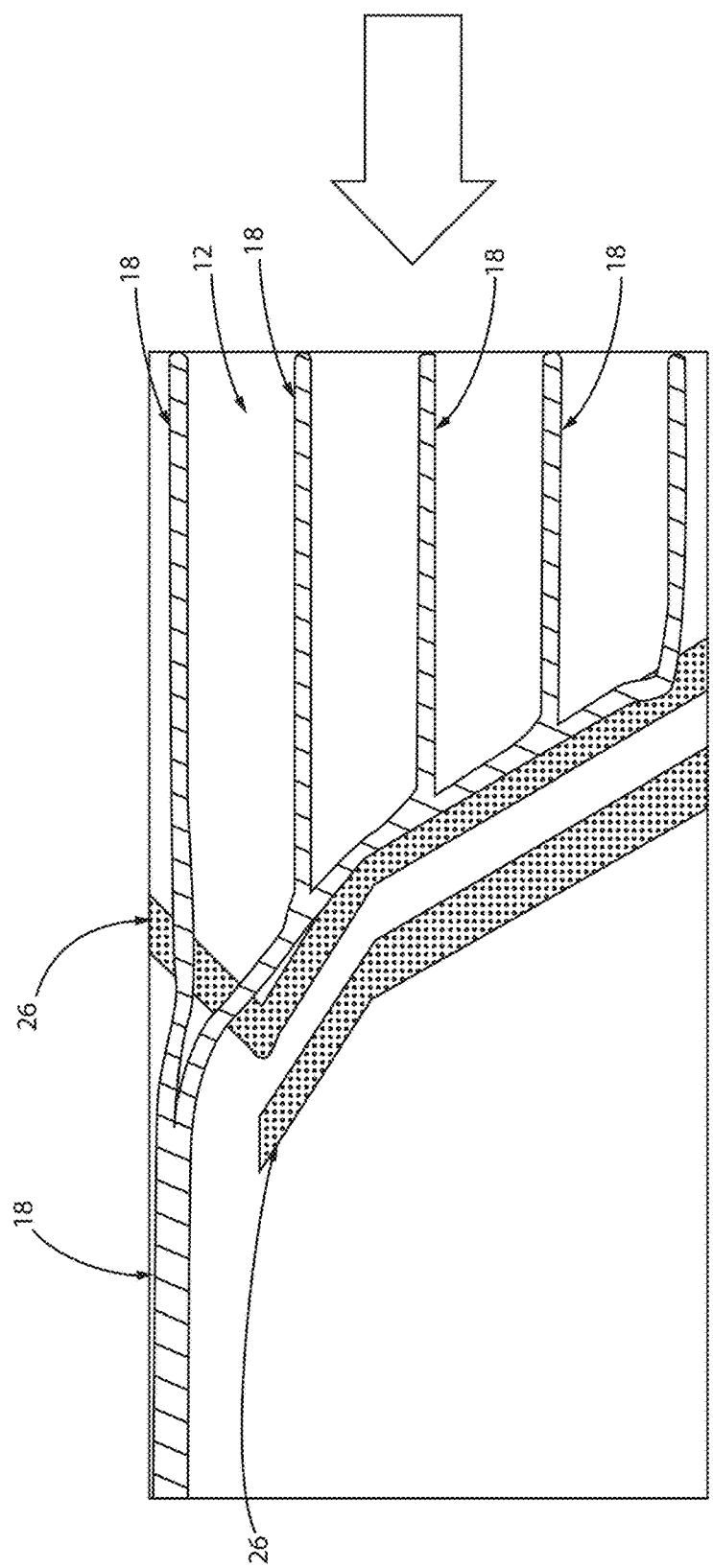
FIG. 21 depicts a simulation of flow paths in a device having the optimized electrode design layout of FIG. 20.

The optimized electrode design layout 26 undergoes further simulations to determine the expected flow path 18 of the 10 µm microparticles, as they flow from right to left. As shown in FIG. 21, as the particles come under the influence of the electrodes 26, the simulated flow paths 18 are determined free of the undesired trapping situation, owing to the optimized electrode design 26.

Using a pixel-based layout approach may benefit from a larger potential library content than for the parametric optimization approach. Articulating concepts with a pixelated design layout may allow for expressing non-intuitive solutions. Initial designs may not be restricted to those stored in a database but may be based on a new arrangement articulated in the pixels.

With the pixel layout approach, it may not be necessary to engage in parametrization, and there may be no restriction on the number of parameters that can be optimized. A simulation mesh in which the object under analysis is divided into parts when simulation is performed such as when using the finite elements analysis method, for example, may be generated only once, as changes in voltages do not require new mesh, ensuring faster computation.

Local variations and adjustments are easier to incorporate and implement with a pixel-based layout. When a trouble spot is found in a design, through the iterative design process, the design can be locally adjusted by simply turning on or off pixels from the array structure near the trouble area until a more optimum performance is achieved.

When selecting the pixel-based design layout as parameter D, the optimization algorithm may benefit from simplifications of the design problem in order to improve efficiency and reduce computational demands. For example, symmetries and/or periodicity of the design objectives and task can be found. The optimization may take place in certain areas, with the optimization area being divided into repeating unit cells e.g., groups of pixels, with cells adjacent to walls or interfaces being identified. Costs functions can be applied to unit cells. Simulation models may be adjusted to unit cells, with simplifications, e.g., assumptions being made when possible to expedite the simulation routines. Constraints, e.g., those related to fabrication, materials, robustness, etc., may be accounted for as with polygonal layouts. The pixel grid configuration may be adjustable, e.g., using a coarser pixel grid for initial optimization and then using a finer grid when the cost function approaches the optimum value. Other advantages may be realized, depending on the operation. Further, the pixel image of the design may be converted to a polygon-based layout for manufacturing and fabrication purposes.

Topology optimization methods can be employed on the unit cell with adjusted cost function and constraints. Discreet portions, e.g., unit cells represented by groups of pixels near the channel wall, may be specifically optimized where a cost function associated with a channel wall is different from the overall cost function. The extended design layout may be optimized, in which an optimized unit cell is replicated as appropriate to provide for an overall optimized design or portion thereof. The global cost function and constraints can be checked against convergence criteria. Further, in carrying out the optimization procedure, a finer pixel grid can be employed within selected unit cells while carrying out changes only in adjacent electrode-pixels, to make selected design adjustments while keeping computational demands manageable.

Figure 22:
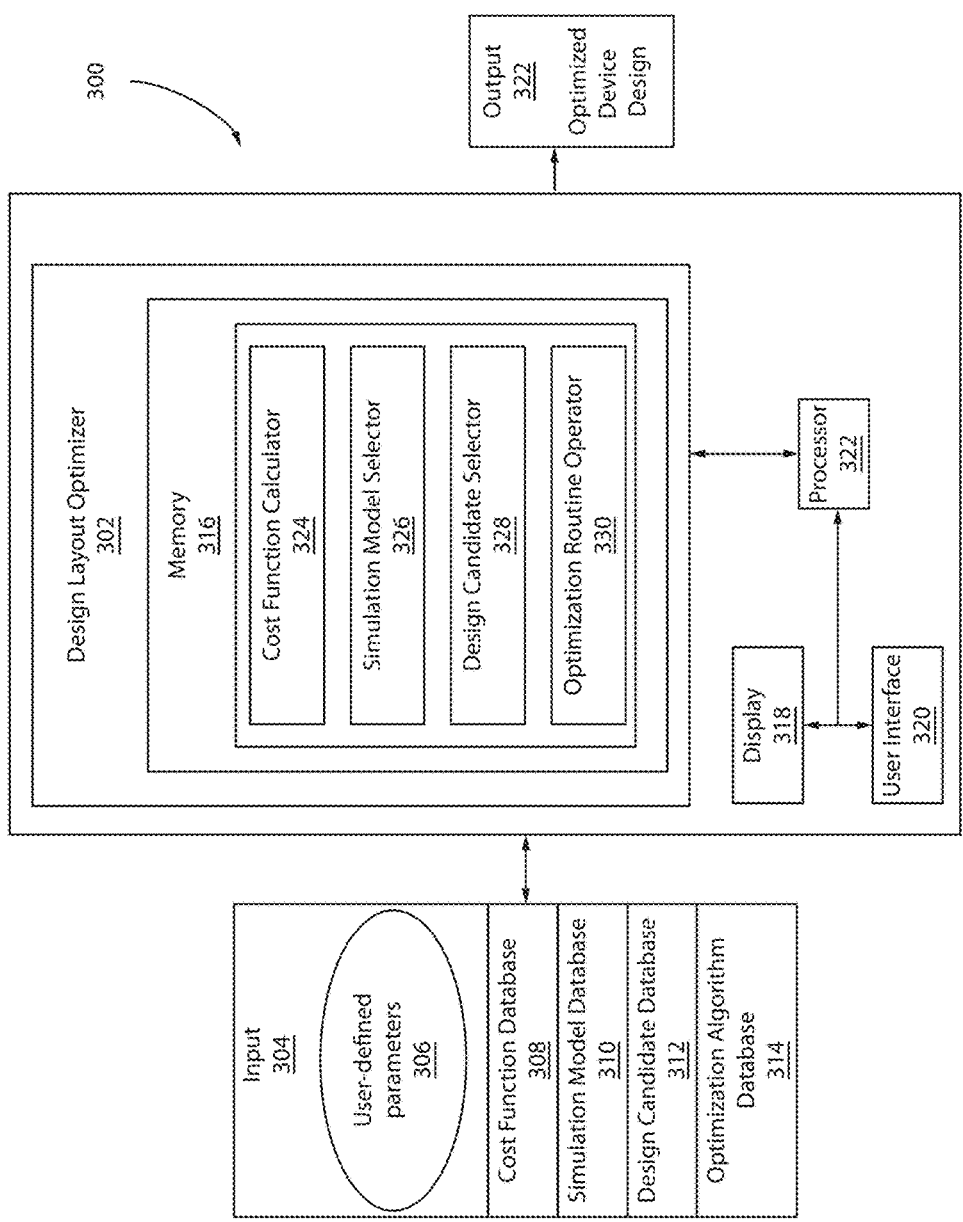
FIG. 22 depicts an exemplary embodiment of a system for designing a micro-fluidic device in accordance with an embodiment of the present principles.

Referring to FIG. 22, a system 300 for optimizing the design of a micro-fluidic device in accordance with an embodiment of the present principles is shown with respect to an operational environment in which it can be utilized. System 300 may be a computer system or computer environment, such as previously mentioned, that optimizes the design layout. System 300 may be locally situated, e.g., at the site where the designers conduct their business and/or where device fabrication occurs. System 300 may be remotely located, e.g., at a location away from where design and fabrication take place. System 300 may also be located in a cloud computing environment.

System 300 is configured to accept input information from different sources. User-defined parameters 306, e.g., particles P, task T, system S and design type D are among the user defined parameters that the system user may input into the system. By way of example, the parameters may be 5 µm and 10 µm polystyrene (PS) particle beads, the task may be the separation of the beads, system parameters (S) may be the channel layout and other device materials, properties of the carrier fluid (viscosity, flow velocity), electrical potential to be applied via the electrodes, frequency of the electrical signal, other electrode features, and the temperature range at which the separation of the particles will take place, among others. Design type D may be a pixel-based layout.

Other information that may be input to the system 300 includes information that may be sent from various databases that may be used at different stages of the optimization routine. Among those inputs include stored cost function algorithms and target cost function values in the cost function database 308, simulation models for simulating a design stored in a simulation model database 310, stored design candidates in a design candidate database 312, and design optimization algorithms stored in an optimization algorithm database 314.

Machine learning capabilities are provided in the system. For example, when an optimized device design with optimized design parameters is returned by the system, the design parameters may then be stored in the design candidate database as a potential design solution that may be employed in the future.

The cost function calculator 324 evaluates the design parameters and either develops a new cost function equation or algorithm, or queries the cost function database for a cost function equation or algorithm that is complimentary, e.g., suited to the present design situation. The cost function may, in some instances, be dependent on different system parameters, e.g., system, task, and particles. In other instances, the task to be performed by the device may be the primary determining factor in the development of the cost function equation/algorithm, or the selection of same from the cost function database. The cost function calculator 324 may select a cost function equation or algorithm from the cost function database 308 or it may develop one based on the parameters and other variables related to the device design and operations to be performed. The cost function calculator sets a cost function target value that represents an optimized design related outcome to the operation performed by the device. In another embodiment, the cost function algorithm may be input by the user.

In some instances, the user will know from experience the cost function algorithm or algorithms that apply to a certain design issue. The system may also select the cost function to be used, given the input restrictions. The cost function is chosen based on the present case. For example, if it is desired to separate particles by size, the cost function would at least include some measure of the distance between particles of different size. In the case that the widest possible separation is desired, then the distance between the particles is maximized. If a specific separation is desired, then the output of the cost function may be calculated for that specific separation, and such output would become the target.

The cost function equation and algorithm that is used by the cost function calculator 324 may be based on the operation to be performed in the device, e.g., in a separation operation the maximum displacement between the two kinds of particles, e.g., the 5 µm and 10 µm polystyrene (PS) particle beads may be articulated in the cost function analysis. It can also, in some embodiments, account for other aspects of the device and operation, e.g., the device geometry, electrode geometry, applied voltage, materials used to construct the device. In one exemplary aspect, the cost function for a maximum lateral displacement may be articulated as: the difference in lateral displacement ($\Delta x$) of each particle type at the channel exit, with each particle type being at the same location at the channel entrance. Cost function $f(u)$ is:

$$f(u) = \frac{1}{M} \sum_i (\Delta x^{(i)}_{10\,\mu m}(u) - \Delta x^{(i)}_{5\,\mu m}(u))$$

M is the number of particles, e.g., beads, that are tracked; $u \equiv (u_1, \ldots, u_n)$ is the parameter vector, which is the list of design parameters that may be modified or varied to find an optimum design, as described above. For i, taking any value from 1 to M is the index assigned to each individual particle used to calculate the cost function value.

The simulation model operator 326 simulates performance of the device under the parameters of the system and other variables that have been input to the system. The performance simulation is run on a simulation model selected by the simulation model operator from a preexisting simulation model that is stored in the simulation model database 310, or on a new simulation model generated by the simulation model operator 326. Simulation models that may be stored in the simulation model database 310 and employed by the simulation model operator 326 include Finite Elements, Finite Differences, Lattice-Boltzmann, and Particle Tracing. Commercial and open source approaches such as Comsol Multiphysics® and openFOAM may also be used.

Design candidate selector 328 identifies initial design candidates based on a best estimate of same. In one embodiment, the design candidate selector 328 is configured to employ the system parameters and other variable (P, T, S, D), the simulation model, and the cost function algorithm in design candidate heuristics in order to determine the initial design candidate. The design candidate selector may query and review stored design candidate entries in the design candidate database 312 and identify and retrieve design candidates that are suited as initial design efforts given the present system parameters. For example, a micro-fluidic device may have been fabricated in the past that is based on a design with similar parameters P, T, S, D. The design candidate selector may identify that design as a design candidate on which to base the present design. Such an operation may be conducted through machine learning, in which past optimized designs serve as a teaching aid for present optimization design candidates selection.

Having selected initial design candidates, the simulation model is run and the cost function is calculated for the initial design candidates. These operations are performed by the simulation model operator 326 and the cost function calculator 324, respectively. The initial design candidate with a cost function closest to the target cost function is selected as the best initial design candidate. The initial design candidate may be the design that was previously fabricated.

Optimization routine operator 330 performs iterations, as needed, to arrive at an optimized design topology that represents an optimized device design. The optimization routine operator employs an optimization algorithm stored in the optimization algorithm database 314 or creates one for the present design situation.

Optimization routine operator 330 may employ the optimization algorithm to fragment the best initial design candidate and parametrize it into variables for optimization, thereby providing a modified design candidate. Fragmentation and parametrization may be based on the type of design or layout that was input into the system as a user defined parameter 306, e.g., whether it was a 2-D polygonal layout or a pixel-based layout. For example, when the initial design candidate is one on which a device has previously been fabricated, the various characteristics of the design are fragmented and parametrized The modified design candidate, with the fragmented and parametrized variables is checked against design constraints, e.g., those related to geometric limitations of the device or electrodes, limitations in fabricating the devices or components thereof, limitations in the materials used in fabrication, particle trajectory, and robustness of the specification, to name a few exemplary design constraints.

The optimization routine operator 330 runs the optimization algorithm on the modified design candidate. The cost function for the modified design candidate is determined, e.g., by the cost function calculator 324. The optimization routine operator 330 then queries for the results of a comparison between the computed cost function of the modified design candidate and the target cost function. In the case where the computed cost function value matches the target cost function value within a predetermined margin, a set of optimized variables representing an optimized design is returned by the optimization routine operator 330. The set of optimized variables are forwarded as system output 332. The output maybe received by a controller for manufacturing the micro-fluidic device in accordance with the design layout, e.g., specifications that were determined by the system 300.

When the comparison shows that the computed cost function of the modified first guess of a design layout does not meet the target cost function, the optimization routine operator 330 again runs the optimization algorithm, first modifying the variables before running the simulations on the modified design. The cost function is then calculated on the modified design layout and compared to the target cost function. The modification of the variables may occur in one or more iterations as needed until a computed cost function for a modified design layout that matches the target cost function value within a predetermined margin is attained. Existing designs that served as initial design candidates may be modified in this way, in which the dimensions and geometries of the devices, for example the microchannel configurations and the electrode configurations, are modified in the optimization routine until the target cost function is reached.

When an optimized design layout is attained, e.g. optimized variables representing an optimized design, the specifications that embody the optimized result may be stored in the design candidate database, for use as a design candidate at a future time, such as when design parameters used in the future are similar to the optimized design parameters of the determined optimum device design.

In one embodiment in accordance with present principles, the system user interface 320 and display 318 provide the designer with an interactive design experience that allows the designer to observe the design process from start to finish and allows the designer to supply input, commands, and instructions throughout the process. FIGS. 23-29 depict an interactive user interface for display on a screen, e.g., a computer monitor. In one embodiment, the user interacts with the system through the interface by way of point and click functionality, such as by moving a cursor over the screen with a computer mouse and clicking on selected system features.

Figure 23:
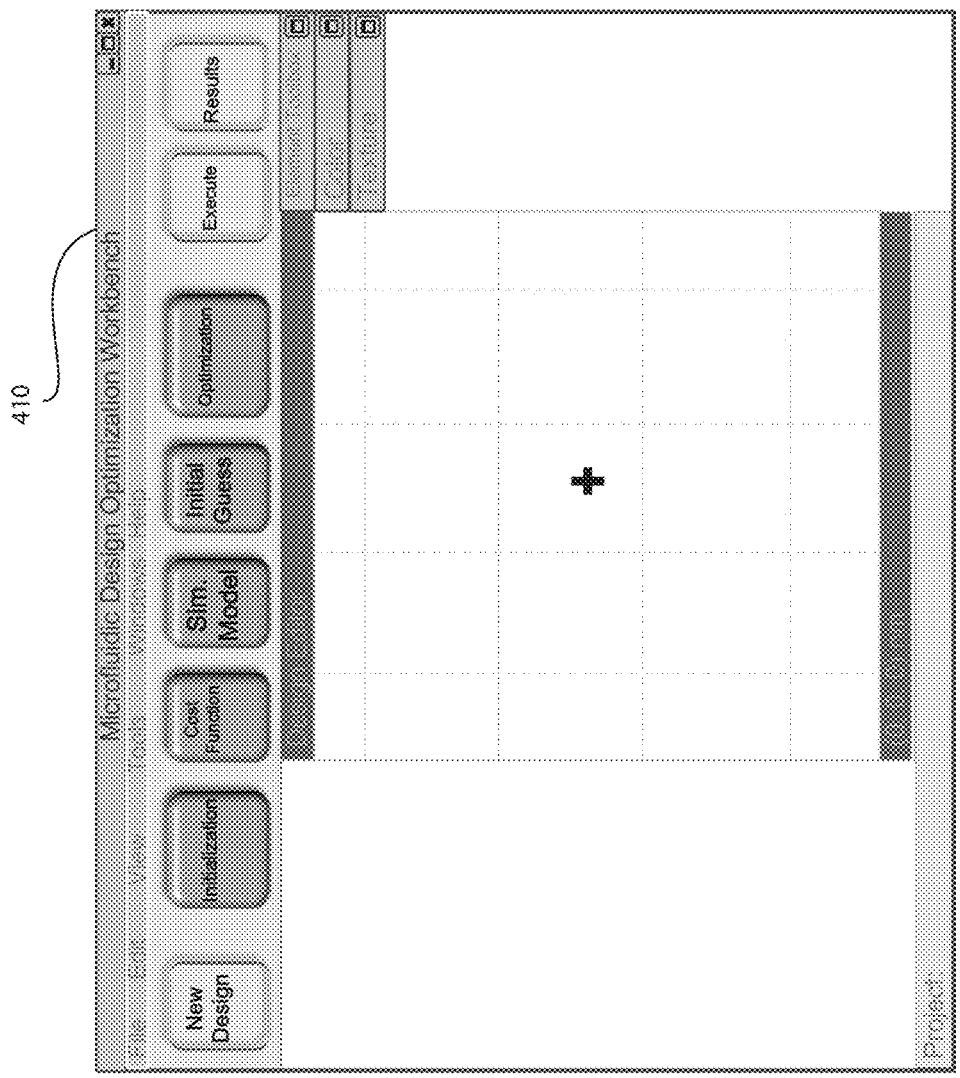
FIG. 23 depicts a first interactive graphical user interface employed in a system for designing a micro-fluidic device in accordance with an embodiment of the present principles.

Referring to FIG. 23, shown is a graphical user interface in which the user can interact with the design process various stages. The user may select and control parameters, functions and controls. FIG. 23 shows an overview 410 of the various stages of design, e.g., cost function, simulation modeling, initial guess, and optimization. The design concerns a dielectrophoresis device for concentrating red blood cells. The final design comprises metallic electrodes as well as micro-pillars.

Figure 24:
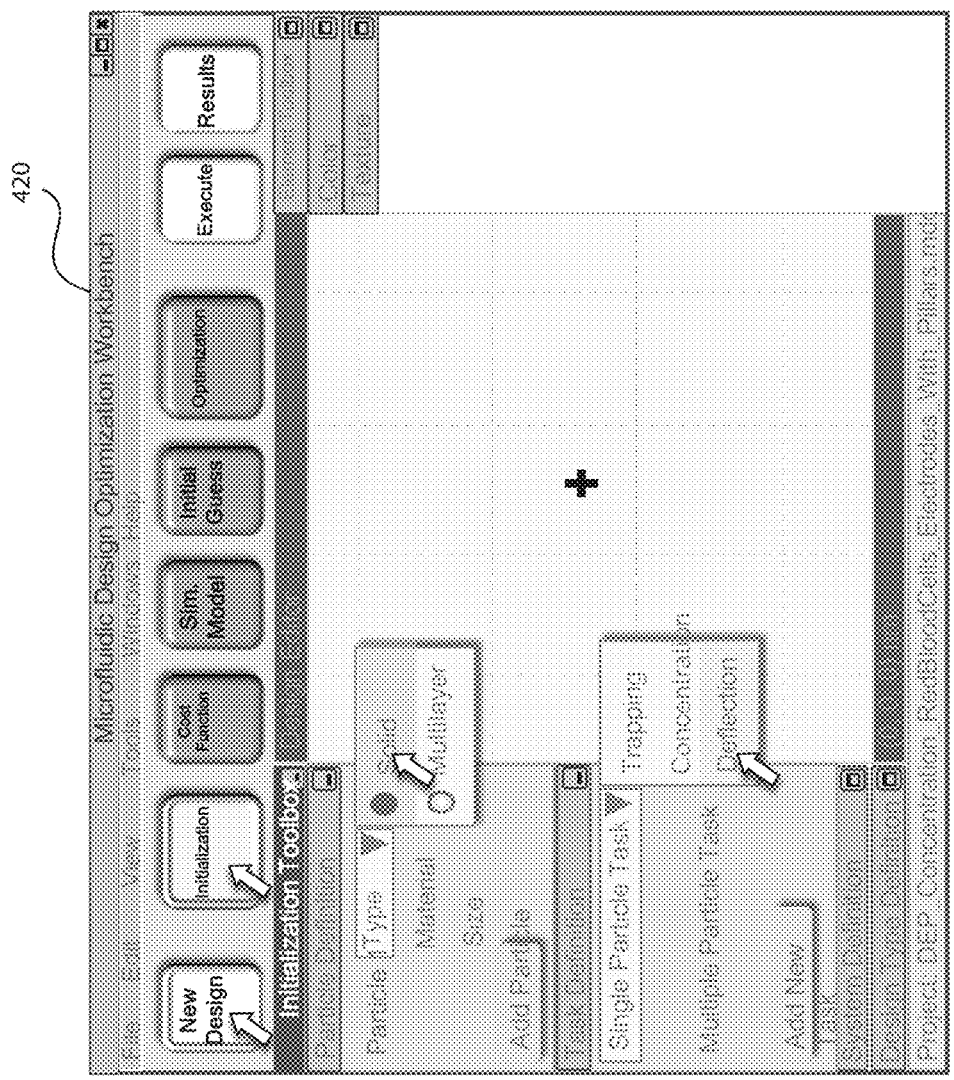
FIG. 24 depicts a second interactive graphical user interface employed in a system for designing a micro-fluidic device in accordance with an embodiment of the present principles.

Referring to FIG. 24, the design process is initialized in this interface 420, by the selecting of particle characteristics and the task to be performed in the device. Some parameters may be selected from a database, and others may be user defined.

Figure 25:
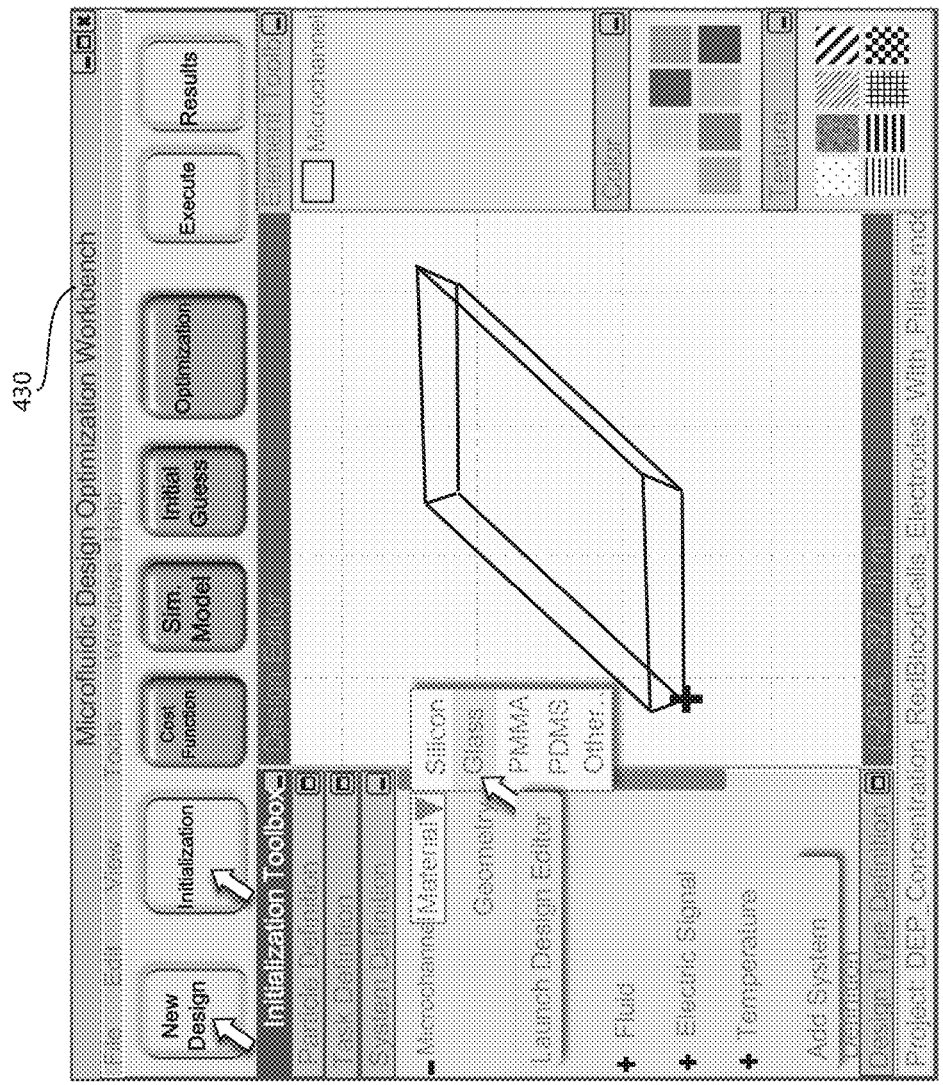
FIG. 25 depicts a third interactive graphical user interface employed in a system for designing a micro-fluidic device in accordance with an embodiment of the present principles.

Referring to FIG. 25, the user selects the parameters of the system in this interface 430. For example, as shown the user selects the material from which the microchannel is formed. Other options include selecting channel geometry, fluid characteristics, the characteristics of the electric signal and the temperature. Additional system definitions may be added, such as those related to the characteristics of the electrodes within the channels.

Figure 26:
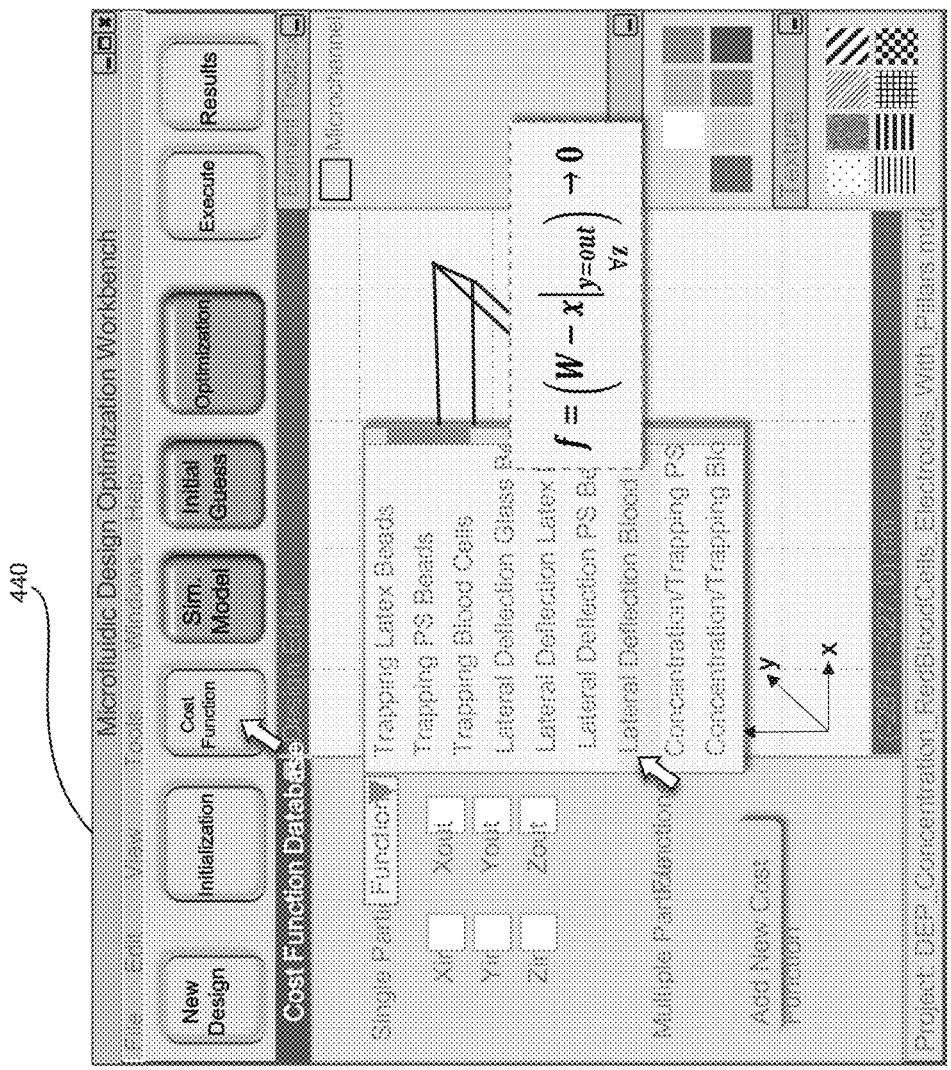
FIG. 26 depicts a fourth interactive graphical user interface employed in a system for designing a micro-fluidic device in accordance with an embodiment of the present principles.

Referring to FIG. 26, aspects relating to the cost function can be defined in this interface 440, such as the particulars of the task to be performed (e.g., lateral deflection of blood cells). Note that the user has the ability to define the extent of the deflection (e.g., $X_{in}$ and $X_{out}$). Here, the cost function may be selected from a cost function database, with the selection being based on the user defined attributes. A similar selection of information may be used to select a simulation model from a simulation model database. Alternatively, the user may define the cost function algorithm and the simulation model.

Figure 27:
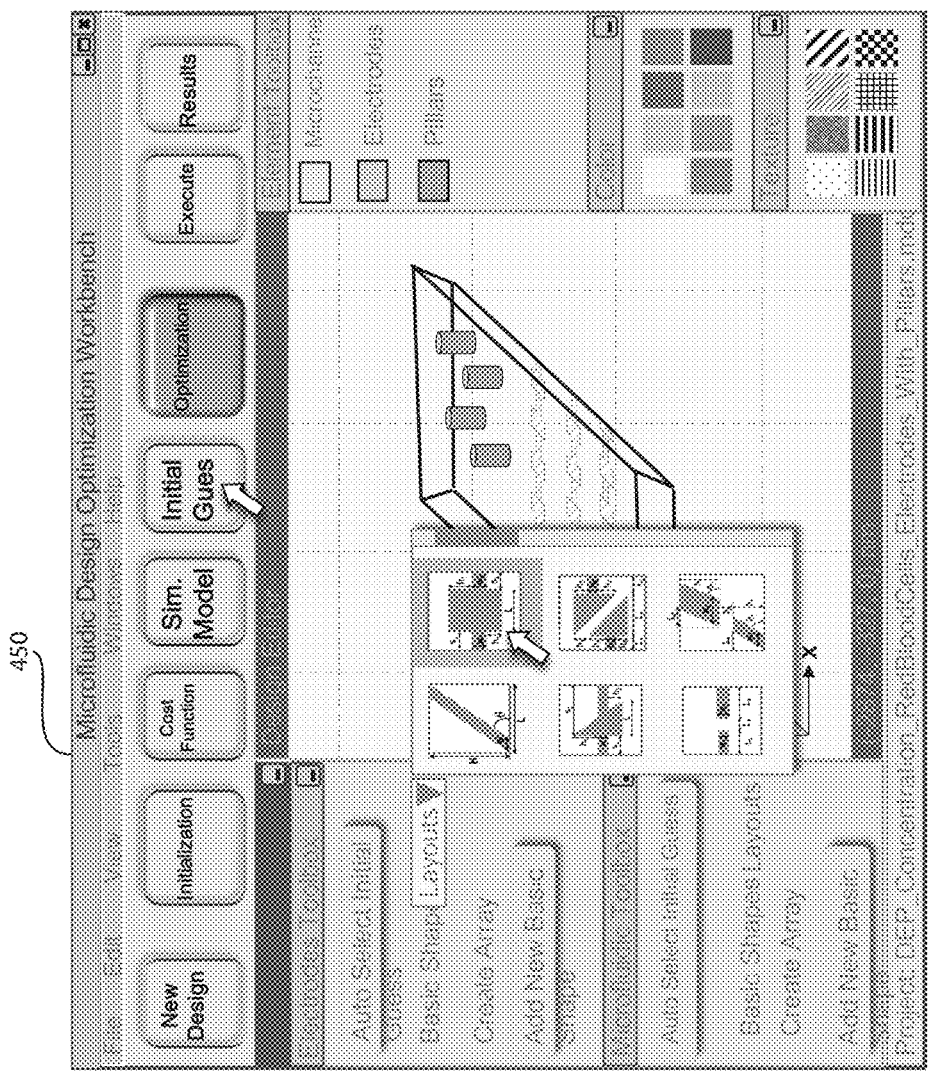
FIG. 27 depicts a fifth interactive graphical user interface employed in a system for designing a micro-fluidic device in accordance with an embodiment of the present principles.

Referring to FIG. 27, the initial design candidates are selected in this interface 450. The initial design layout that is estimated includes aspects of the device design, such as electrode attributes (geometries, dimensions, layout), micro-fluidic device elements such as pillars, valves, and hydraulic resistances. The design candidate heuristics tool may be applied here to select and customize a design layout taken from a database of previously successful design candidates. The user may also define an original design candidate using this aspect of the interactive user interface. As shown, the user may select an electrode geometry from a pallet of same.

Figure 28:
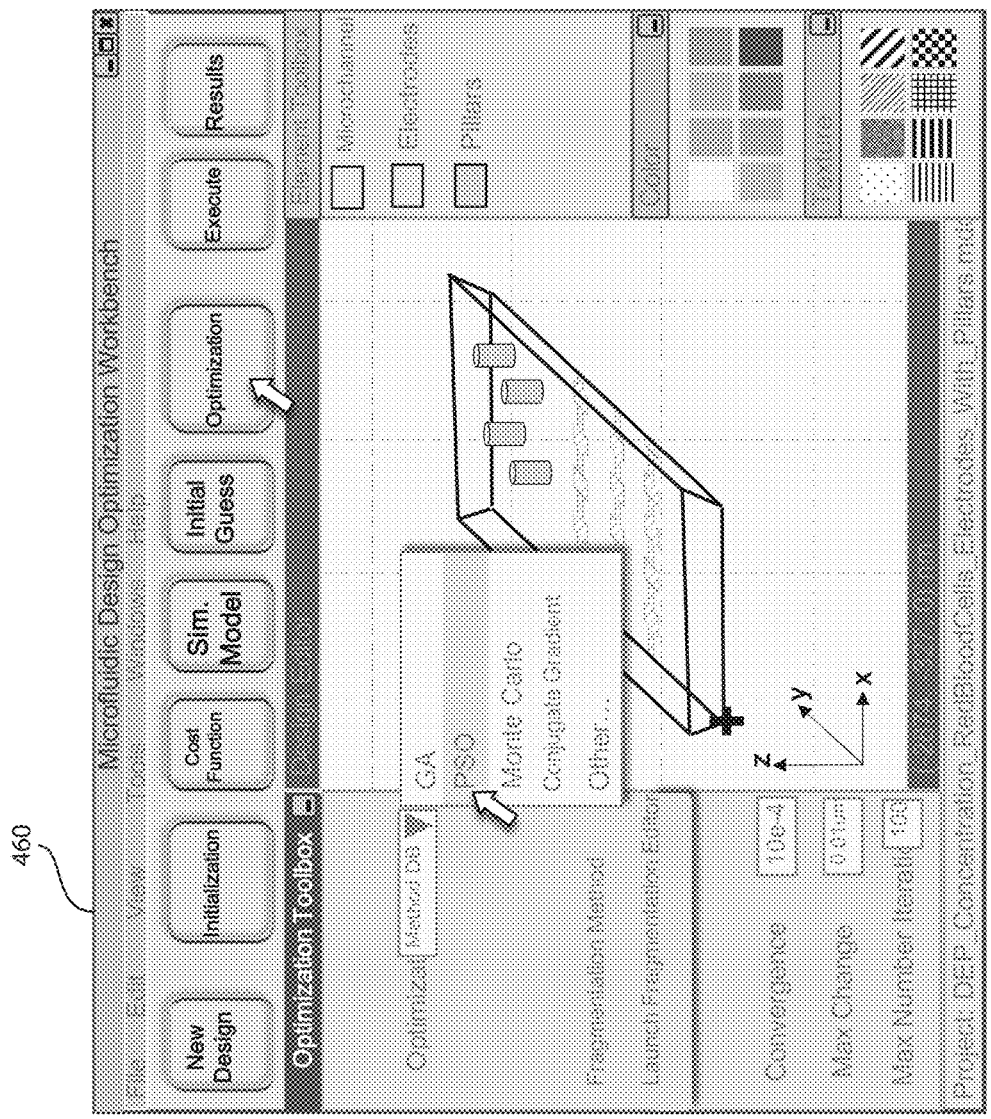
FIG. 28 depicts a sixth interactive graphical user interface employed in a system for designing a micro-fluidic device in accordance with an embodiment of the present principles.

Referring to FIG. 28, the optimization routine is selected in this interface 460. As shown, the user is selecting particle swarm optimization (PSO) as the optimization approach. Here, the design may be fragmented and parametrized by selecting the fragmentation editor functions available through the interface. Note that a design is beginning to form in the background of the display. The design includes the glass walls, the electrode layout, and the micro-pillars, which offset some of the rows, e.g., flow paths, in the lateral direction, and may facilitate the providing of multiple flow paths that co-exist within the microchannel. Particles with a diameter smaller than a selected value progress with the forward flow, while larger particles are deflected and travel sideways.

Figure 29:
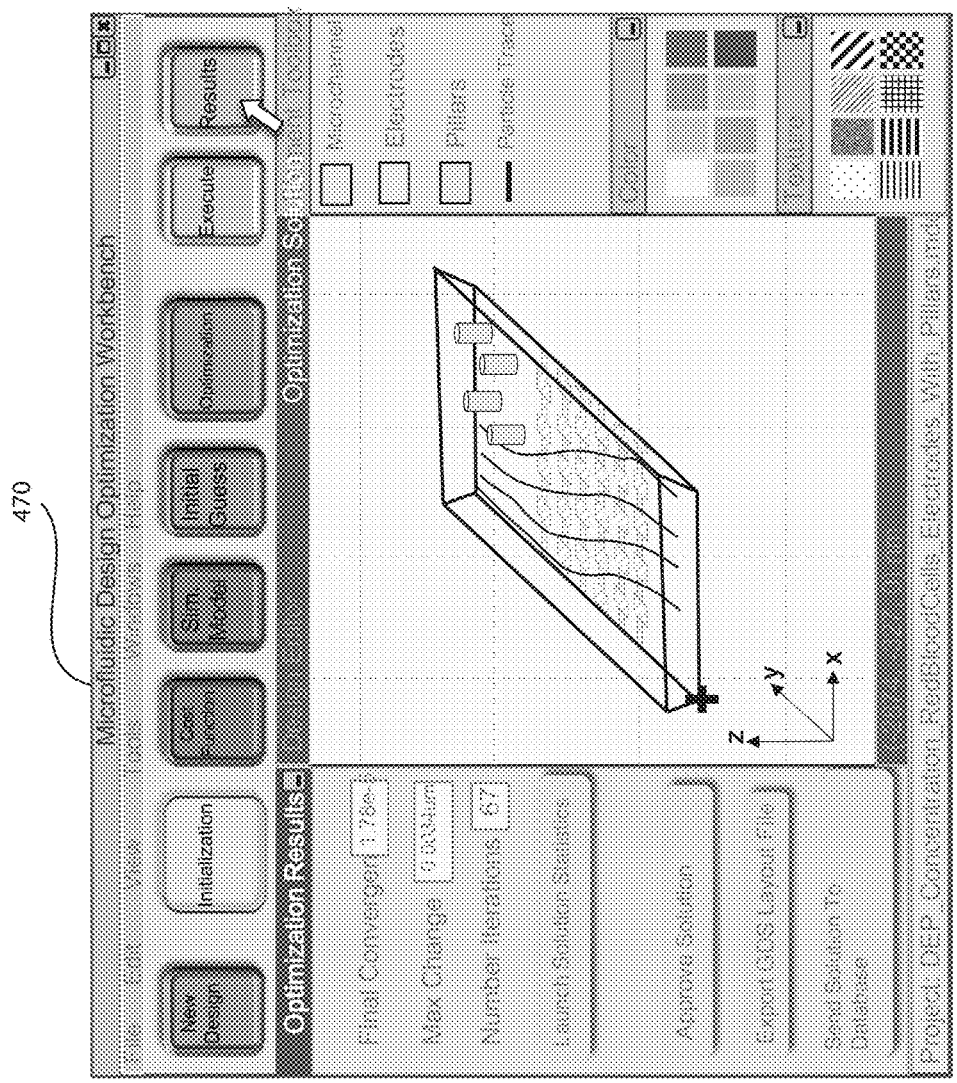
FIG. 29 depicts a seventh interactive graphical user interface employed in a system for designing a micro-fluidic device in accordance with an embodiment of the present principles.

Referring to FIG. 29, the optimization routine has executed the optimization algorithm and an optimized designed solution has been returned in this interface 470. The user interface displays the design and the specifications of the optimized design layout. The user may at this time choose to fine tune any aspect of the design by choosing any of the functions previously noted. At this time, the optimized solution can be sent to the first guess database where first design guesses are stored.

Optimized micro-fluidic devices are fabricated in accordance with the optimized designs that are generated by the systems and methods that have been described. For example, the optimized solution 470 may be sent as output to a controller that receives the system output of an optimized device design and controls the fabrication in a micro-fluidic device fabricator of optimized devices according to the optimum device design parameters. In one exemplary embodiment, a micro-fluidic device was designed in accordance with the device shown in FIG. 10, in which an electrode layout for the device having the microchannel configuration as shown provides a maximum lateral displacement of the 10 µm polystyrene particles and the 5 µm polystyrene particles.

Figure 30:
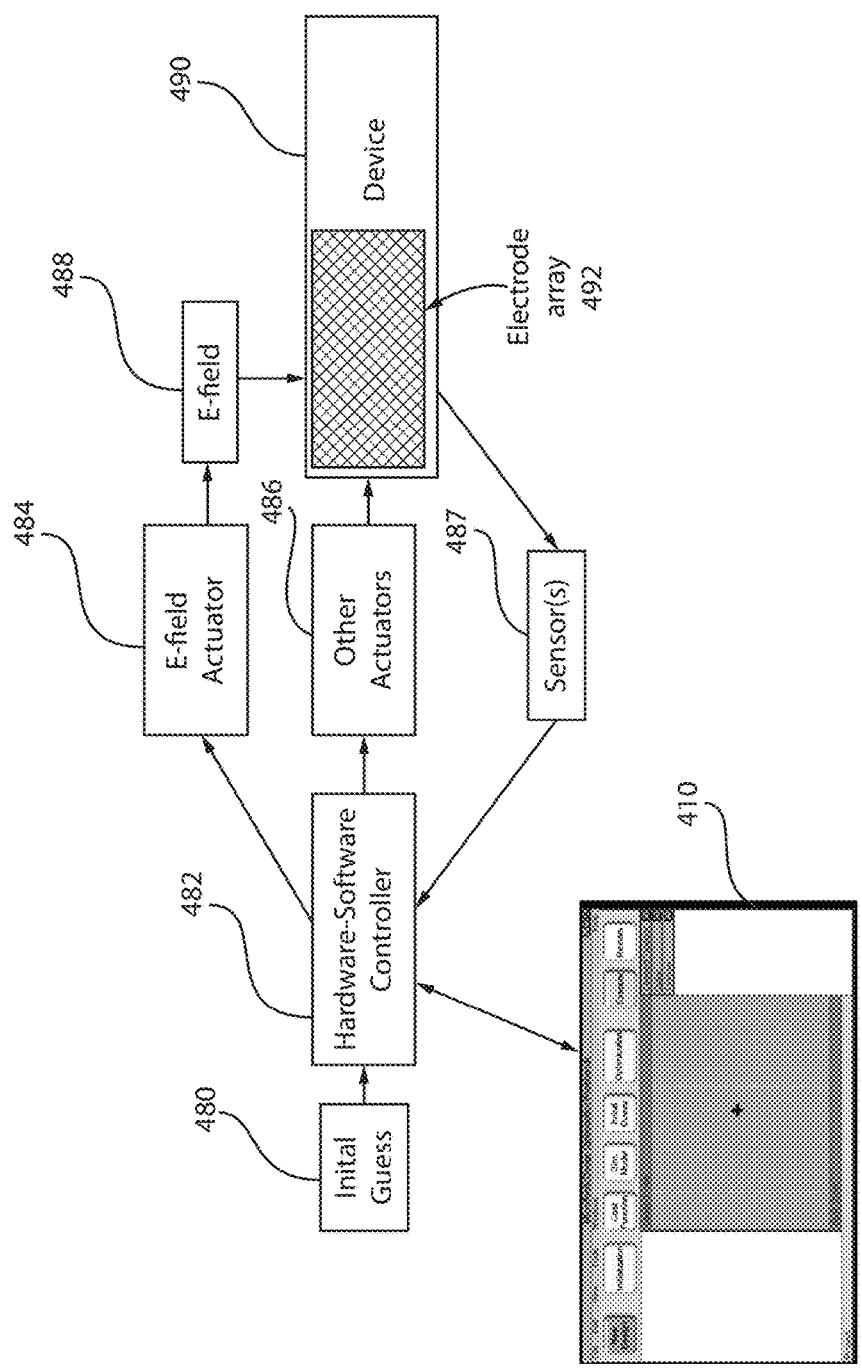
FIG. 30 shows another exemplary embodiment in accordance with present principles in which an optimized voltage configuration of a pixel-based electrode layout is provided to a controller that actuates the voltages of each electrode in a micro-fluidic device having a switchable array of electrodes.

In yet another arrangement, as shown in FIG. 30, the system output 470 of an optimized device design in which parameter D is pixel-based, the optimized voltage configuration, e.g., an arrangement of voltage assignments on an array of electrodes of fixed geometry is sent to a micro-fluidic device controller that controls an electrode array in a micro-fluidic device. The optimized voltage configuration is implemented by the micro-fluidic device controller and is employed in controlling an electrode array in the micro-fluidic device. Through the controller, the optimized voltage configuration is implemented in the micro-fluidic device by turning electrodes on and off to conform to the optimized design, thereby providing a real world device optimization in a device that is carrying out a defined task, such as particle separation.

While the present disclosure includes a detailed description on cloud computing, it should be understood that implementation of the subject matter described herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 31:
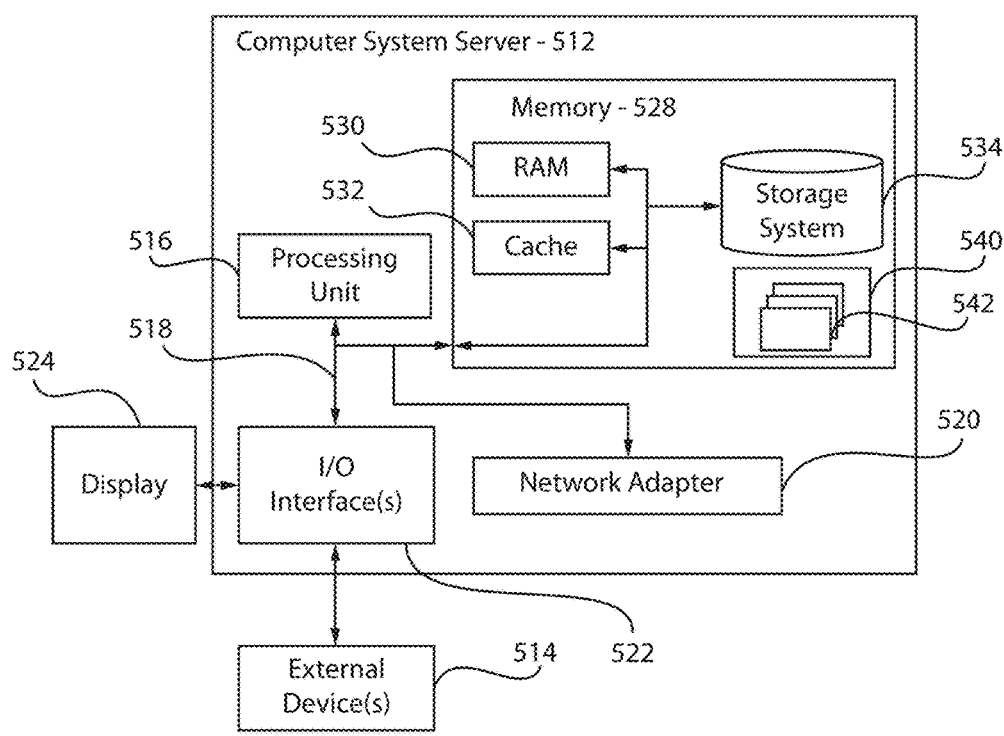
FIG. 31 shows an exemplary cloud computing node in accordance with an embodiment of the present principles.

Referring now to FIG. 31, a schematic of an example of a cloud computing node 510 is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

Figure 32:
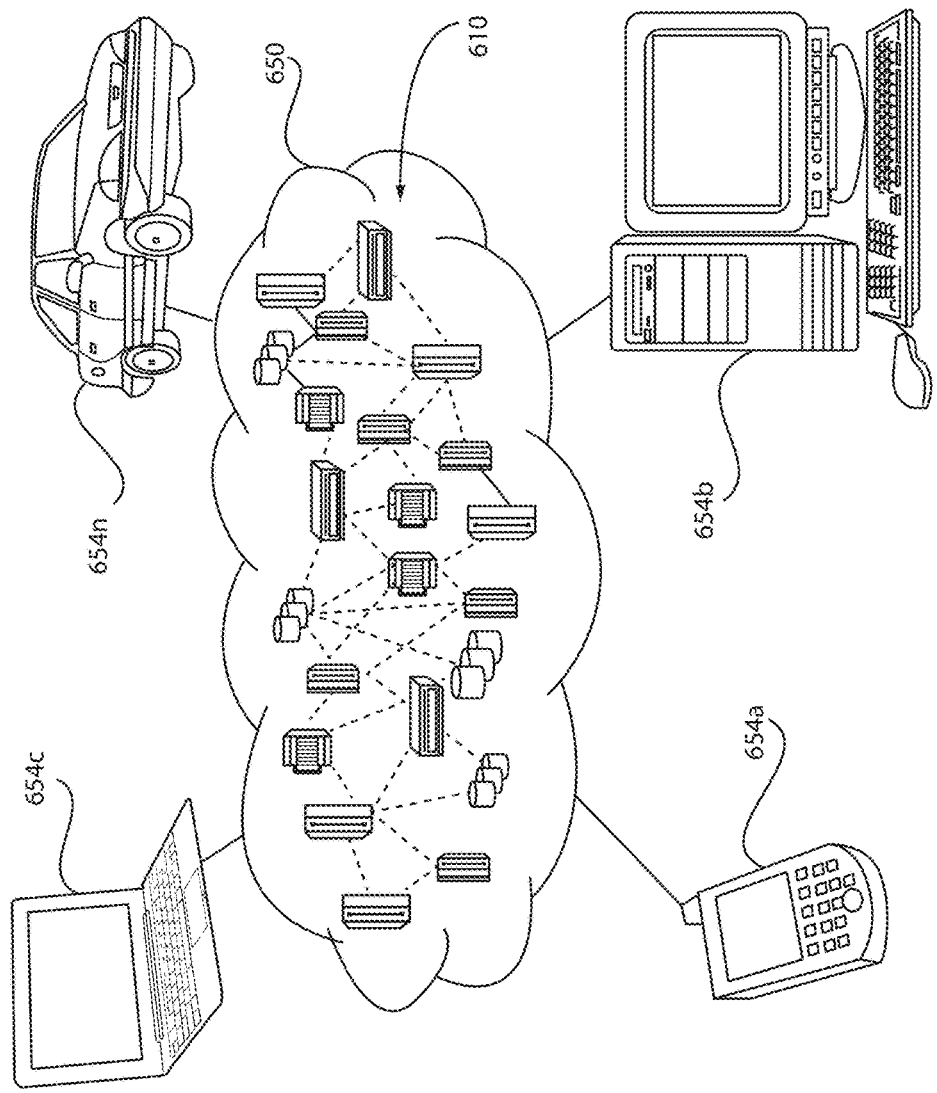
FIG. 32 shows an exemplary cloud computing environment in accordance with an embodiment of the present principles.

As shown in FIG. 32, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples include, but are not limited to: microcode, device drivers, redundant processing units, external disk drive arrays, RAID systems, tape drives, and data archival storage systems, etc.

Referring now to FIG. 32, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 32 are intended to be illustrative only and that computing nodes 610 and cloud computing environment 650 can communicate with any type of computerized device over any type of network and/or network addressable connection (e.g., using a web browser).

Figure 33:
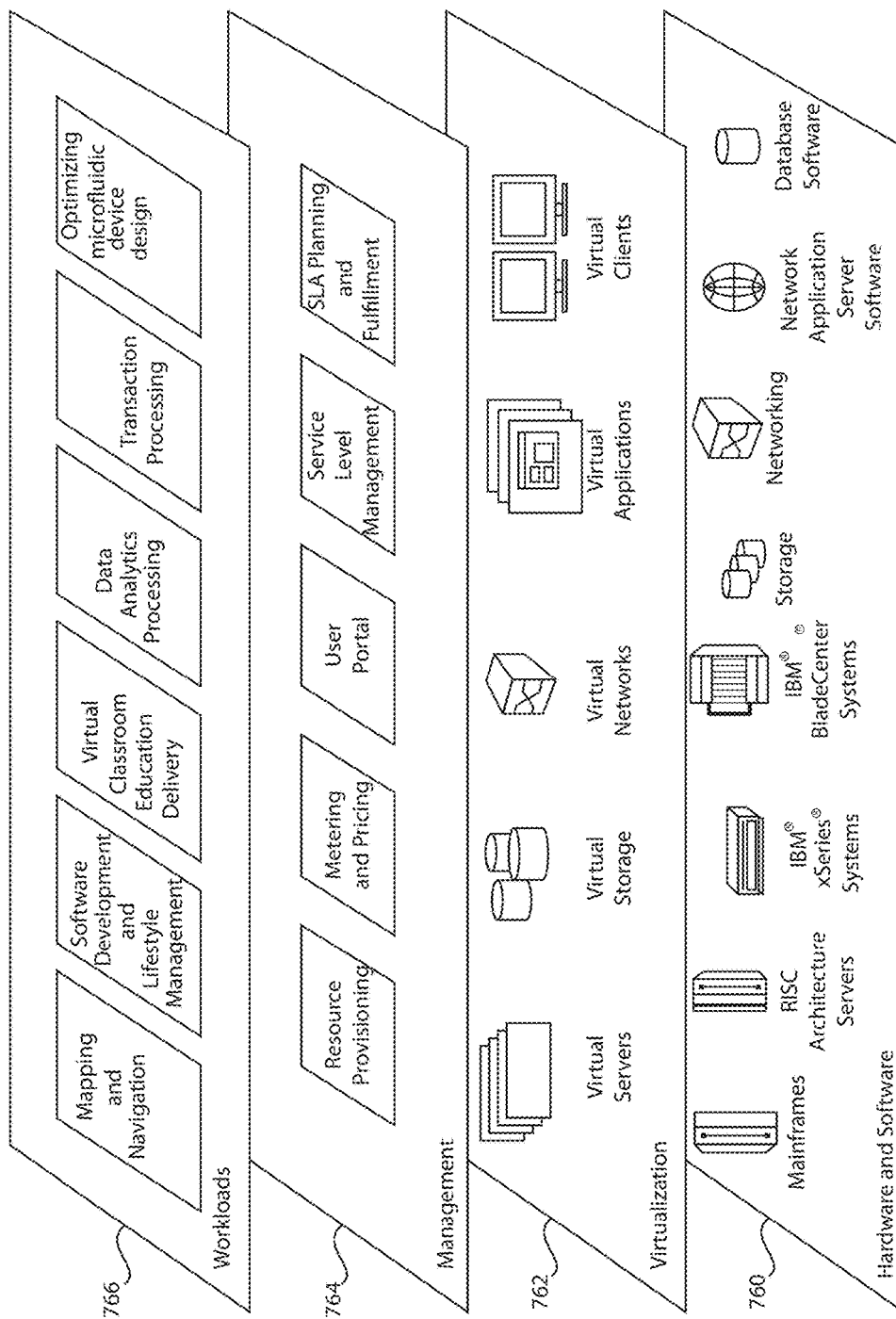
FIG. 33 shows exemplary abstraction model layers, in accordance with an embodiment of the present principles.

FIG. 33 shows a set of functional abstraction layers provided by cloud computing environment 650. It should be understood in advance that the components, layers, and functions shown in FIG. 33 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and micro-fluidic device design.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method of manufacturing and designing micro-fluidic devices (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method of fabricating micro-fluidic devices, comprising:

determining a target cost function value based device design parameters;

simulating the performance of one or more chosen design candidates in a selected simulation model;

identifying a design candidate with a cost function value closest to the target cost function value as a best initial design candidate;

iteratively modifying design parameters of the best initial design candidate to provide a modified design candidate having design parameters differing from the design parameters of the best initial design candidate, computing a cost function value for the modified initial design candidate, and deriving optimized device design parameters from a modified design candidate, until a computed cost function value for the modified design candidate meets the determined target cost function value; and fabricating an optimized micro-fluidic device using the modified design candidate and the optimized device design parameters.

2. The method of claim 1, wherein the target cost function value is further defined in relation to one or more variables that include computed particle positions at selected device locations and maximum lateral particle displacement at selected device locations.

3. The method of claim 1, further comprising choosing first design candidates from one or more preexisting design candidates representing previously manufactured micro-fluidic devices that have design parameters similar to the parameters on which the target cost function value is based.

4. The method of claim 1, wherein the running of an optimization routine comprises selecting a preexisting optimization algorithm, fragmenting the parameters of the best initial design candidate into variables to be adjusted for optimization, determining the cost function value for the modified design candidate and checking an intermediate solution that is obtained against design constraints, determining if the computed cost function value for the modified design candidate meets the determined target cost function value; and, when repeating the optimization routine on the modified design candidate, further modifying the variables for optimization until the computed cost function value for the modified design candidate meets the determined target cost function value.

5. The method of claim 4, wherein the constraints are one or more of particle trajectory, geometric limitations of the device, geometric limitations of an electrode, limitations imposed by device materials, and robustness of a design specification.

6. The method of claim 1, wherein the running of an optimization routine comprises modifying a best initial design candidate that represents the design of a previously fabricated micro-fluidic device by modifying design parameters of the previously fabricated micro-fluidic device to provide a modified design candidate having an electrode configuration that differs from the electrode configuration of the previously fabricated micro-fluidic device.

7. The method of claim 1, further comprising entering the optimized device design parameters of an optimized device design into a database of design candidates to be used as a chosen design candidate in a subsequent designing of a micro-fluidic device.

8. The method of claim 1, wherein the parameters relating to particles are one or more of particle size, particle mass, particle material, and particle morphology; the parameters relating to task are one or more of sorting particles, separating particles, trapping particles, and concentrating particles; the parameters relating to system are one or more of channel material, channel geometry, channel dimensions, device geometry, properties of fluid transported in the device, electrode voltages, electrode geometry, electrode dimensions, frequency of electrical signals, and device operating temperature; the parameters relating to design type are one or more of polygonal design layout type and pixel design layout type.

9. The method of claim 1, further comprising displaying one or more of the chosen design candidates, the best initial design candidate, the modified design candidate and the optimized device design on an image display device of an interactive workstation in which a user may input information pertaining to the method.

10. The method of claim 1, further comprising displaying one or more of the first design candidates, the best initial design candidate, the modified design candidate and the optimized device design as images comprised of pixels on a display device, and wherein device design changes are imaged on the display device through pixel manipulation.

11. The method of claim 1, wherein the optimized device design parameters of an optimized device design include an optimized configuration of electrode voltage and operating conditions that are incorporated in the micro-fluidic device of the optimized device design.

12. A system for fabricating micro-fluidic devices, comprising:
one or more processors including memory;
a cost function calculator configured to determine a target cost function value based device design parameters and to determine cost function values for design candidates;
a simulation model operator configured to simulate the performance of one or more design candidates in a selected simulation model and to identify a best initial design candidate based on computed cost function value;
an optimization routine operator configured to iteratively modify design parameters of the best initial design candidate to provide a modified design candidate having parameters that differ from the parameters of the best initial design candidate, to check a cost function value of the modified design candidate against the target cost function value, and to derive optimized device design parameters from a modified design candidate, until a computed cost function value for the modified design candidate meets the determined target cost function value; and
a fabricator configured to fabricate an optimized micro-fluidic device using the modified design candidate and the optimized device design parameters.

13. The system of claim 12, further comprising an interactive user interface for displaying device design progress of one or more of the design candidates, the best initial design candidate, the modified design candidate and the optimized device design and for receiving user input of design-related commands during device design.

14. The system of claim 12, further comprising a micro-fluidic device fabricator and a controller that receives the system output of an optimized device design and controls the fabrication of optimized micro-fluidic devices according to the optimum device design parameters in the micro-fluidic device fabricator.

15. The system of claim 12, wherein the optimization routine operator is configured to modify a best initial design candidate that represents the design of a previously fabricated micro-fluidic device by modifying design parameters of the previously fabricated micro-fluidic device to provide a modified design candidate having an electrode configuration that differs from the electrode configuration of the previously fabricated micro-fluidic device.

16. The system of claim 12, wherein the optimization routine operator is configured to forward the optimized design parameters of an optimized device design to a database that stores device designs that are used as design candidates.

17. The system of claim 12, wherein the cost function calculator is configured to select the cost function algorithm on the basis of determining an optimized device design for carrying out one or more of maximizing lateral particle displacement in the device between device channel entrance and device channel exit, maximizing lateral displacement of a particle between two selected locations in the device, and maximizing lateral displacement of two or more kinds of particles between selected device locations.

18. The system of claim 12, wherein the cost function calculator is configured to select a cost function algorithm from a database based on the design parameters.

19. The system of claim 12, wherein the simulation model operator is configured to select a simulation model that selects and simulates device performance based on parameters relating to one or more of flow path geometry, electrode geometry, flow path dimensions, electrode dimensions, applied voltages in the device, particle kind, particle size, particle morphology, particle separation, particle trapping, and particle concentrations.

20. A computer program product for fabricating micro-fluidic devices, the computer program product comprising a non-transitory computer readable storage medium having program instructions embodied therewith, the program instructions being executable by a computer to cause the computer to perform a method comprising:

determining a target cost function value based device design parameters;
      simulating the performance of one or more chosen design candidates in a selected simulation model;
      identifying a design candidate with a cost function value closest to the target cost function value as a best initial design candidate;
      iteratively modifying design parameters of the best initial design candidate to provide a modified design candidate having design parameters differing from the design parameters of the best initial design candidate, computing a cost function value for the modified initial design candidate, and deriving optimized device design parameters from a modified design candidate, until a computed cost function value for the modified design candidate meets the determined target cost function value; and
   fabricating an optimized micro-fluidic device using the modified design candidate and the optimized device design parameters.

* * * * *